US012810558B2

(12) United States Patent
Huang et al.

(10) Patent No.: US 12,810,558 B2
(45) Date of Patent: Nov. 24, 2026

(54) VIRTUAL INTERACTION METHODS, DEVICES, AND STORAGE MEDIA

(71) Applicant: Beijing Zitiao Network Technology Co., Ltd., Beijing (CN)

(72) Inventors: Lichen Huang, Beijing (CN); Xiangyu Huang, Beijing (CN); Liyue Ji, Beijing (CN); Pingfei Fu, Beijing (CN); Fan Yang, Beijing (CN); Yixin Sun, Beijing (CN); Li Lu, Beijing (CN); Hongxiao Pang, Beijing (CN); Cheng Zeng, Beijing (CN); Jingqi Qin, Beijing (CN); Tan He, Beijing (CN); Qiang Chen, Beijing (CN); Jinping Xu, Beijing (CN); Kang Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 115 days.

(21) Appl. No.: 18/525,503

(22) Filed: Nov. 30, 2023

(65) Prior Publication Data

US 2024/0177435 A1 May 30, 2024

(30) Foreign Application Priority Data

Nov. 30, 2022 (CN) ......................... 202211528421.2
Dec. 2, 2022 (CN) ......................... 202211542463.1
Jan. 16, 2023 (CN) ......................... 202310077310.2

(51) Int. Cl.
*G06T 19/00* (2011.01)
*G06F 3/01* (2006.01)
*G06T 13/20* (2011.01)

(52) U.S. Cl.
CPC ............ *G06T 19/006* (2013.01); *G06F 3/016* (2013.01); *G06T 13/20* (2013.01)

(58) Field of Classification Search
CPC ....... G06T 19/006; G06T 13/20; G06F 3/016; G06F 3/011
See application file for complete search history.

(56) References Cited

U.S. PATENT DOCUMENTS 9,811,166 B2 * 11/2017 Bell ........................ G01B 11/14
10,249,095 B2 * 4/2019 Energin ............... G02B 27/017
(Continued)

FOREIGN PATENT DOCUMENTS

CN 104754394 A 7/2015
CN 111131847 A 5/2020
(Continued)

OTHER PUBLICATIONS

China Patent Application No. 202310077310.2; Office Action; dated Jun. 1, 2026; 16 pages.

*Primary Examiner* — Motilewa Good-Johnson
(74) *Attorney, Agent, or Firm* — BakerHostetler

(57) ABSTRACT

The present application provides a method, apparatus, device and medium for virtual interaction, wherein the method includes: presenting a media content stream in a virtual space, wherein the media content stream includes at least one interactive object; switching a current camera position to a target camera position according to interactive indication information; presenting an interactive trigger zone and the interactive object in interactive space of the target camera position; and interacting with the interactive object according to the interactive trigger zone. The present application makes interactive operations of the user in the virtual space more vivid and rich, and thus enhances interactivity of the user in the virtual space and improves interactive quality of the virtual interaction.

20 Claims, 20 Drawing Sheets

(56) References Cited

U.S. PATENT DOCUMENTS 10,818,093 B2 * 10/2020 Chen .......................... G06T 7/70
10,839,603 B2 * 11/2020 Wang ........................ G06T 7/20
10,841,174 B1 * 11/2020 Ely ....................... H04W 76/14
11,184,647 B1 * 11/2021 Khalid ............. H04N 21/23418
11,539,918 B1 * 12/2022 Libin .................. H04L 12/1827
11,769,306 B2 * 9/2023 Li ........................... G06F 3/016
345/633
11,921,970 B1 * 3/2024 Hoover ................... G06F 3/017
11,995,311 B2 * 5/2024 Zou ..................... G06F 3/04815
12,328,530 B1 * 6/2025 Libin .................. G06F 3/04845
2008/0101456 A1 * 5/2008 Ridge .................. H04N 21/431
348/E5.051
2013/0024785 A1 * 1/2013 Van Wie ............... G06F 3/0484
715/753
2013/0132058 A1 * 5/2013 Butler ..................... G06F 17/00
703/21
2015/0035750 A1 * 2/2015 Bailey .................... G06V 40/28
345/158
2015/0234547 A1 * 8/2015 Barnett ............... G06F 3/04815
715/768
2017/0209786 A1 * 7/2017 Zhu ......................... A63F 13/26
2020/0159367 A1 * 5/2020 Xia ..................... G06F 3/04186
2020/0312029 A1 * 10/2020 Heinen ................... G06T 7/593
2021/0306386 A1 * 9/2021 Smith ..................... H04L 65/61
2021/0365104 A1 * 11/2021 Ke .......................... G06T 13/40
2022/0030179 A1 * 1/2022 Kundu .................... G06T 7/194
2022/0086203 A1 * 3/2022 Morris ................... H04N 7/157
2022/0137800 A1 * 5/2022 Long ..................... G06F 3/0486
715/769
2022/0152505 A1 * 5/2022 Pan ....................... A63F 13/426
2022/0272406 A1 * 8/2022 Wang ................. H04N 21/4394
2022/0327580 A1 * 10/2022 Zhang ................ G06Q 30/0276
2022/0335697 A1 * 10/2022 Harding .................. G06T 15/00
2022/0360865 A1 * 11/2022 Champel .............. H04N 21/816
2023/0019216 A1 * 1/2023 Liu .................... H04N 21/4781
2023/0089143 A1 * 3/2023 Zheng ..................... A63F 13/86
463/31
2023/0128658 A1 * 4/2023 Young ................. G06F 3/04883
463/36
2023/0139626 A1 * 5/2023 Berliner .............. G06F 3/04815
345/156
2023/0236660 A1 * 7/2023 Kundu .................... G06T 13/40
345/156
2023/0237192 A1 * 7/2023 Kahan .................... G06V 10/60
726/1
2023/0241501 A1 * 8/2023 Wu ..................... A63F 13/5372
463/31
2023/0376161 A1 * 11/2023 Neff .................... G06F 3/04812
2024/0061496 A1 * 2/2024 Etwaru ................... G06F 3/011
2024/0061546 A1 * 2/2024 Etwaru ............... G06F 3/04845
2024/0177435 A1 * 5/2024 Huang .................. G06T 19/006
2024/0288932 A1 * 8/2024 Ma ......................... G06T 19/006
2024/0307780 A1 * 9/2024 Deng ...................... A63F 13/52
2024/0397129 A1 * 11/2024 Huang ............... H04N 21/2187
2025/0021164 A1 * 1/2025 Cui ......................... A63F 13/42

FOREIGN PATENT DOCUMENTS

CN 114247141 A 3/2022
CN 114286119 A 4/2022

* cited by examiner

VIRTUAL INTERACTION METHODS, DEVICES, AND STORAGE MEDIA

CROSS-REFERENCE TO RELATED APPLICATION

This application claims the priority to and benefits of Chinese Patent Application No. 202211528421.2 filed on Nov. 30, 2022, Chinese Patent Application No. 202211542463.1 filed on Dec. 2, 2022 and Chinese Patent Application No. 202310077310.2 filed on Jan. 16, 2023. All the aforementioned patent applications are hereby incorporated by reference in their entireties.

TECHNICAL FIELD

Embodiments of the present disclosure relates to the field of extended reality (XR) technology, in particular, to a method, apparatus, device and medium for virtual interaction.

BACKGROUND

With the rapid development of XR technology, more and more users enter the virtual environment (virtual space) through XR devices to perform various interactive operations such as social interactions, learning, and entertainment in the virtual space.

At present, when users perform interactive operations in the virtual space, the common virtual interactive ways are pop-up chats or gift interactions, for example, users send virtual gifts to interactive objects, and the like. However, the above virtual interactive ways are relatively rigid and single, resulting in low interactivity.

SUMMARY

Embodiments of the present application provide a method, apparatus, device, and medium for virtual interaction, which makes interactive operations of a user in a virtual space more vivid and rich, so that the interactivity of the user in the virtual space can be enhanced and the interactive quality of the virtual interaction can be improved.

In a first aspect, an embodiment of the present application provides a method for virtual interaction, comprising:

- presenting a media content stream in a virtual space, wherein the media content stream comprises at least one interactive object;
- switching a current camera position to a target camera position, according to interactive indication information;
- presenting an interactive trigger zone and the interactive object in interactive space of the target camera position; and
- interacting with the interactive object according to the interactive trigger zone.

In a second aspect, an embodiment of the present application provides an apparatus for virtual interaction, comprising:

- a first presenting module, configured to present a media content stream in a virtual space, wherein the media content stream comprises at least one interactive object;
- a camera position switching module, configured to switch a current camera position to a target camera position, according to interactive indication information;

- a second presenting module, configured to present an interactive trigger zone and the interactive object in interactive space of the target camera position; and
- an interacting module, configured to interact with the interactive object according to the interactive trigger zone.

In a third aspect, an embodiment of the present application provides a method for human-machine interaction which is applied to an XR device, comprising:

- presenting a media content stream in a virtual space; and
- presenting corresponding interactive guidance information in the virtual space to guide a user to perform a corresponding interactive event in the virtual space, according to interactive indication information of the media content stream in current presenting progress.

In a fourth aspect, an embodiment of the present application provides an apparatus for human-machine interaction which is configured to a XR device, comprising:

- a media presenting module, configured to present a media content stream in a virtual space;
- an interactive guidance module, configured to present corresponding interactive guidance information in the virtual space to guide a user to perform a corresponding interactive event in the virtual space, according to interactive indication information of the media content stream in current presenting progress.

In a fifth aspect, an embodiment of the present application provides a method for virtual-reality based game processing,

- comprising: displaying a first virtual reality space, wherein the first virtual reality space is configured to present a first media content to a user;
- displaying a first game subspace in the first virtual reality space, to enable the user to observe the first media content and the first game subspace simultaneously;
- displaying a first game object in the first game subspace, wherein the first game object is associated with the first media content; and
- displaying corresponding game feedback information based on an operation of the user on the first game object.

In a sixth aspect, an embodiment of the present application provides an apparatus for virtual-reality based game processing, comprising:

- a virtual space display unit, configured to display a first virtual reality space, wherein the first virtual reality space is configured to present a first media content to a user;
- a game space display unit, configured to display a first game subspace in the first virtual reality space, to enable the user to observe the first media content and the first game subspace simultaneously;
- a game object display unit, configured to display a first game object in the first game subspace, wherein the first game object is associated with the first media content; and
- a feedback information display unit, configured to display corresponding game feedback information based on an operation of the user on the first game object.

In a seventh aspect, an embodiment of the present application provides an electronic device, comprising:

- a processor and a memory, wherein the memory is configured to store computer programs, and the processor is configured to call the computer programs from the memory and execute the computer programs to perform the method described in the embodiments above or their various implementations.

In a eighth aspect, an embodiment of the present application provides a computer-readable storage medium configured to store computer programs, wherein the computer programs cause a computer to perform the method described in the embodiment above or their various implementations.

In a ninth aspect, an embodiment of the present application provides a computer program product comprising computer instructions, when executed on an electronic device, causing the electronic device to perform the method described in the embodiment above its various implementations.

BRIEF DESCRIPTION OF THE DRAWINGS

For the purpose of more clarity in illustrating technical solutions in embodiments of the present application, reference drawings to be used in the descriptions of the embodiments will be briefly introduced below. It is apparent that the reference drawings in the descriptions below are only some of the embodiments of the present application and that other reference drawings may be acquired according to these drawings for those of ordinary skill in the art without other creative working.

DETAILED DESCRIPTION

Figure 1:
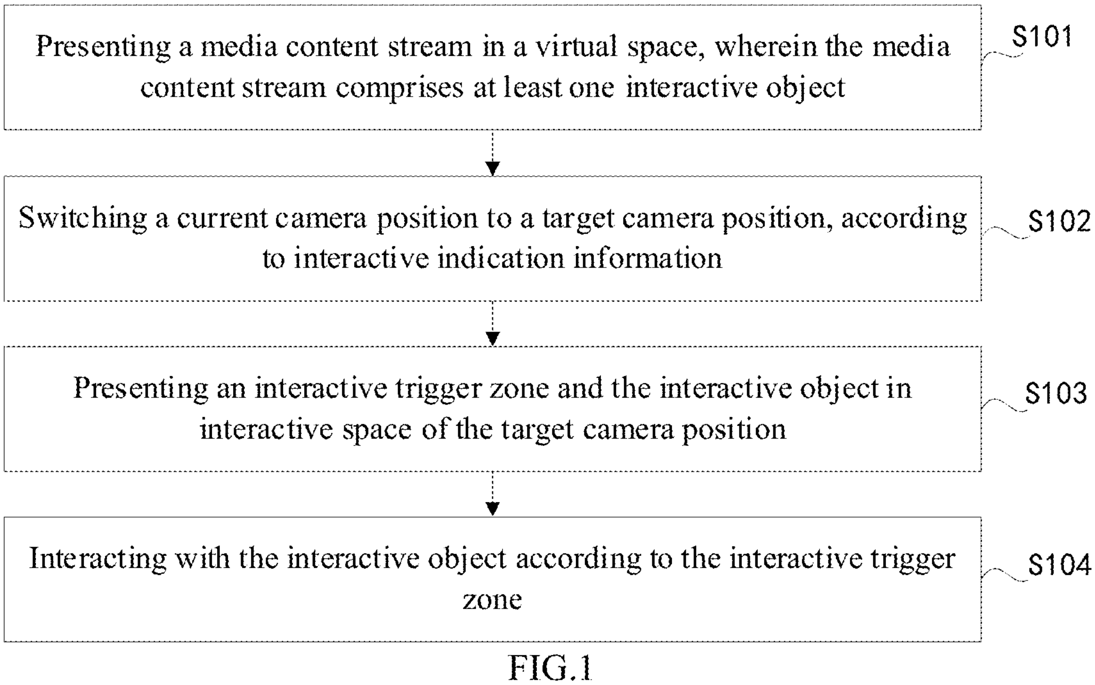
FIG. 1 is a schematic flow diagram of a first method for virtual interaction provided by embodiments of the present application.

The technical solutions in the embodiments of the present application will be described clearly and completely in the following in conjunction with the accompanying drawings in the embodiments of the present application, and it is obvious that the described embodiments are only a part of the embodiments of the present application, but not all of the embodiments. According to the embodiments in this application, all other embodiments obtained by those of ordinary skill in the art without creative working fall within the scope of protection of this application.

It is to be noted that the terms "first", "second" and the like in the specification and claims of the present application and the accompanying drawings described above are used to distinguish between similar objects and need not to be used to describe a particular order or sequence. It shall be understood that the data used as such may be interchangeable, where appropriate, so that the embodiments of the present application described herein can be implemented in an order other than those illustrated or described herein. In addition, the terms "comprising" and "having" and any variations thereof, are intended to cover non-exclusive inclusion, for example a process, method, system, product, or server comprising a series of steps or units need not be limited to those steps or units that are clearly listed, but may include other steps or units that are not clearly listed or that are inherent to those process, method, product or device. In order to facilitate the understanding of the embodiments of the present application, before describing various embodiments of the present application, firstly some of the concepts involved in all of the embodiments of the present application are described with appropriate interpretations, as follows.

1) Virtual reality (VR), a technology for creating and experiencing virtual worlds, generating computationally a virtual environment which is a kind of multi-source information (the VR as mentioned herein includes at least visual perception, and further includes auditory perception, tactile perception, motion perception, and even taste perception, olfactory perception, and the like), and achieving a fused, interactive three-dimensional dynamic views for the virtual environment and simulation for entity behaviors, so as to immerse a user in a simulated virtual reality environment, thereby achieving various applications for the virtual environment such as mapping, gaming, video, education, healthcare, simulation, co-training, sales, assisting in manufacturing, maintenance, and restoration, and the like.

2) Device(s) for virtual reality (VR device), a terminal to implement the VR effects, and may generally be provided as in the form of a spectacle, a helmet-mounted display (HMD), and contact lenses for the achievement of visual perception and other forms of perception. Of course, the implementation forms of the VR device are not limited to these, which may be further miniaturized or large-scale according to the actual needs.

Optionally, a VR device documented in embodiments of the present application may include, but are not limited to, the following types:

2.1) PC-based VR (PCVR) Device(s), utilizing the PC to perform calculations and data output related to VR functionalities, in which a peripheral-connected PCVR device utilizes the data output from the PC to achieve VR effects;

2.2) mobile VR device(s), supporting to set up a mobile terminal (e.g., a smart phone) in various ways (e.g., a head-mounted display equipped with a specialized card slot), and calculations related to VR functionalities being performed by a mobile terminal through connecting with the mobile terminal in a wired or wireless way and data being output to the mobile VR device, for example watching VR videos through the mobile terminal; and 2.3) all-in-one VR device(s), equipped with a processor that performs calculations related to virtual functionalities, and thus having independent VR input and output functionalities that do not need to be connected to a PC or a mobile terminal, providing a high degree of freedom of use.

3) Augmented reality (AR): a technology that calculates camera pose parameters of a camera in the real world (also referred to the 3D world or the actual world) in real-time in the process of image acquisition by the camera, and adds virtual elements to the images acquired by the camera according to the camera pose parameters. The virtual elements include, but are not limited to images, videos, and 3D models. The goal of AR technology is to make interactions by snapping the virtual world onto the real world on a screen.

4) Mixed reality (MR): a simulation set that integrates computer-created sensory inputs (e.g., virtual objects) with sensory inputs or representations thereof from a physical set. In some MR sets, the computer-created sensory inputs may be adapted to changes in the sensory inputs from the physical set. Additionally, some electronic systems for presenting MR sets may monitor orientation and/or location relative to the physical set, to enable a virtual object to interact with an actual object (i.e., a physical element from the physical set or representation thereof). For example, the system may monitor motion such that the virtual plant appears to be stationary relative to physical buildings.

5) Extended reality (XR): refers to all actual and virtual combined environments and human-computer interactions generated by computer technologies and wearable devices, which encompasses various forms of virtual reality (VR), augmented reality (AR), and mixed reality (MR) and the like.

After the introduction of some concepts involved in embodiments of the present application, a method for virtual interaction provided by embodiments of the present application is described in detail below in conjunction with the accompanying drawings.

It is considered that when a user performs social interactive operations in the virtual space, the common ways of the virtual interaction are pop-up chats or gift interactions, e.g., the user sends virtual gifts to interactive objects, and the like. However, since the above ways of interaction are relatively rigid and single, resulting in low overall interactivity, the present application designs a new scheme of virtual interaction, through which the interactive operations of the user in the virtual space can be more vivid and rich, thereby enhancing interactivity of the user in the virtual space and improving the interactive quality of virtual interaction.

FIG. 1 is a schematic flow diagram of a method for virtual interaction provided by embodiments of the present application. The embodiments of the present application are applicable to a virtual interactive scenario. The virtual interactive method may be performed by a virtual interactive device. The virtual interactive device may comprise hardware and/or software and may be integrated into an electronic device. The electronic device may be any hardware device capable of providing a virtual space to a user. For example, the electronic device may be, but is not limited to: an XR device, a tablet, a cell phone (e.g., a folding screen phone, a large screen phone, etc.), a laptop, a personal digital assistant (PDA), a smart TV, a smart screen, an HDTV, a 4K T V, and other devices. Among them, the XR device may be a VR device, an AR device, an MR device, or an augmented virtuality (AV), etc., which are not specifically limited by this application.

Considering that the implementation principle of the various electronic devices described above are the same, in order to clearly illustrate the embodiments of the present application, the following specific illustration is mainly based on the example of the electronic device as the XR device.

As shown in FIG. 1, the method may comprise steps as below:

S101: presenting a media content stream in a virtual space, wherein the media content stream comprises at least one interactive object.

In embodiments of the present application, the virtual space may be a combined reality and virtual environment for human-computer interaction that is provided to a user through an XR device, and the combined reality and virtual environment may be displayed as a three-dimensional image.

It shall be understood that in the virtual space, the user may control his or her own avatar through the XR device in the form of glasses, HMDs, or contact lenses and the like, to perform various interactive operations such as social interactions, entertainment, learning, work, and telecommuting, with avatars controlled by other users, or with other objects in the virtual space.

Optionally, when the user uses the XR device, the user equips the XR device at first, and then the user enables the XR device to be in a working state by turning on the XR device. Further, the XR device may simulate, for the user, the virtual space for displaying various media contents to provide diverse interactions to the user, causing the user to enter the corresponding virtual space according to their needs.

Subsequent to entering the virtual space, a plurality of media content streams are provided in the virtual space according to the watching needs of the user to watch the media content streams in the virtual space, thereby supporting the user to select any one of the plurality of media content streams for presentation. That is, in a case where the selection operations of the user on any one of the media content streams in the virtual space is detected, actual media content stream data of the selected media content stream is obtained, and the media content stream is presented in the virtual space.

In embodiments of the present application, the media content stream includes, but is not limited to, at least one of a video stream and a streaming multimedia file.

It shall be understood that when the media content stream is the video stream, the video stream may be a pre-recorded audio/video stream, e.g., a concert audio/video stream obtained by recording a screen and the like. When the media content stream is the streaming multimedia file, the streaming multimedia file may be an audio-video stream in one certain live scenario, e.g., an audio-video stream of one certain concert, and the like.

Additionally, the media content stream in the present application may include: a 180° 3D media content stream and a 360° 3D media content stream.

Further, an interactive object in the media content stream may be a virtual object or an actual object. To be exemplary, when the media content stream is the pre-recorded concert audio/video stream, the interactive object in the concert audio/video stream may be a virtual artist or a virtual idol. When the media content stream is a live audio/video stream of one certain concert, the interactive object in the live audio/video stream may be an actual artist or an actual idol.

In some implementable embodiments, watching zones with different angles are set in the virtual space optionally in the present application, so that the user may see media content streams from different perspectives in different watching zones. Moreover, a corresponding presentation scenario may be simulated in the virtual space according to the media content stream selected by the user, to further enhance the immersive experience of the media content stream in the virtual space for the user.

Figure 2:
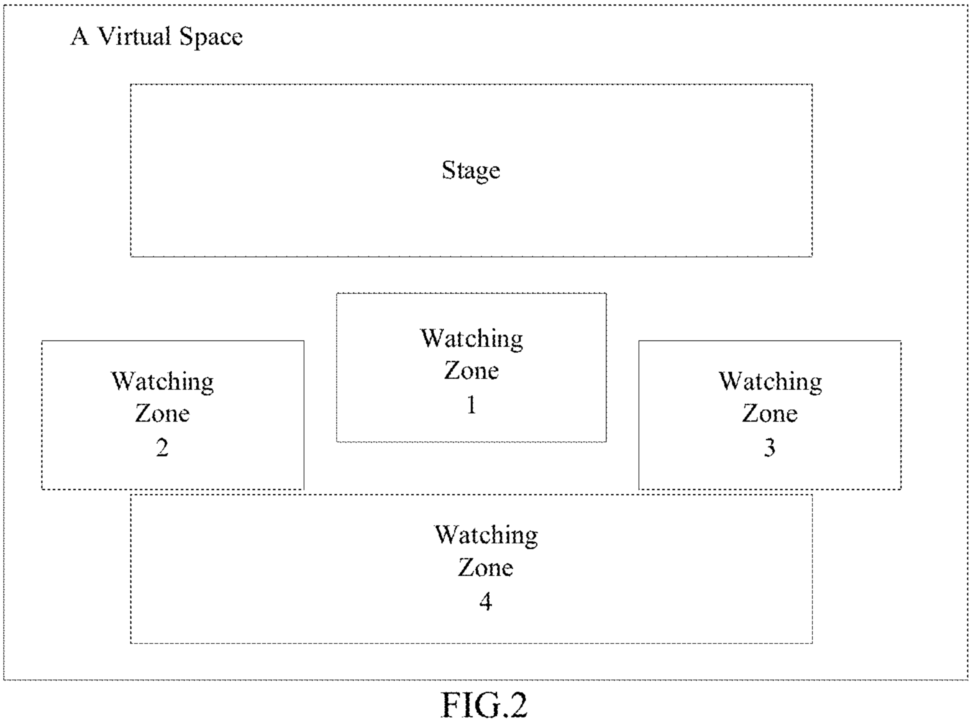
FIG. 2 is a top view of a virtual space provided by embodiments of the present application.

To be exemplary, taking one certain concert as an example as shown in FIG. 2, stage zones and watching zones are set in the virtual space. Among them, the quantity of watching zones is 4, naming watching zone 1, watching zone 2, watching zone 3, and watching zone 4, respectively. Moreover, each watching zone is set with a camera at a corresponding angle, i.e., there are different camera positions in the virtual space, so that the user can see media content streams from different perspectives by switching the camera positions.

S102: switching a current camera position to a target camera position, according to interactive indication information.

In embodiments of the present application, the interactive indication information is configured to indicate information for entering an interactive scenario, causing the user may interact with an interactive object in the interactive scenario.

Herein, the current camera position refers to a camera position at which the user is watching the media content stream, and the target camera position refers to a camera position at which the interaction occurs, i.e., the user may perform interactive operations with the interactive object in the space (interactive space) corresponding to a scope of the perspective of the target camera position.

In the present application, optionally, a camera position which is nearest to the stage is determined to be the target camera position, to achieve a close interaction with the interactive object of the user. To be exemplary, assuming that the way of distribution for the stage zones and the watching zones is shown as FIG. 2 in one certain concert scenario, when the watching zone 1 is nearest to the stage, the watching zone 1 may be selected to be the zone at which the virtual interaction occurs, and the camera position of the watching zone 1 is used as the target camera position correspondingly.

In order to enable to interact with interactive objects in the media content stream vividly and naturally in the process of the user watching the media content stream, the present application may set the interactive indication information in the media content stream, or may also set the interactive indication information on a timeline in virtual space. Whereby, the XR device determines that there is a need to enter an interactive scenario, once the interactive indication information is detected in the process of presenting the media content stream to the user. At this time, the current camera position of the user is automatically switched to the target camera position, such that the user may interact with at least one interactive object in the media content stream in the interactive space of the target camera position.

In embodiments of the present application, setting the interactive indication information in the media content stream may set corresponding interactive indication information at different positions in the media content stream. For example, when an action of an interactive object in the media content stream is determined to be an interactive triggering action, one interactive indication information may be set at a position of the media content corresponding to the interactive triggering action. Herein, the interactive triggering action may be any pre-defined action, e.g., a flying kiss action, a hand heart action, and the like, which is not limited herein.

The interactive indication information set on the timeline in the virtual space may set the interactive indication information at any timeline node of the timeline. To be exemplary, a plurality of interactive indication information is set on the timeline according to a pre-set time interval. Herein, the pre-set time interval may be equally spaced or non-equally spaced. For example, when the total length of the timeline is 1 hour, and the pre-set time interval is to set one interactive indication information every 15 minutes, then at this time, the interactive indication information may be set at each position of the $15^{th}$ minute, the 30th minute, the $45^{th}$ minute, and the $60^{th}$ minute positions on the timeline. As another example, when the total length of the timeline is 1 hour, and the pre-set time interval is to increase by 5 minutes at each interval, then the interactive indication information may be set at each position of the $10^{th}$ minute, the $25^{th}$ minute, and the $45^{th}$ minute of the timeline.

As one optional implementation, if the present application is to set corresponding interactive indication information at different positions in the media content stream, the XR device determines whether the interactive indication information is set on each frame of the presented media content or not in the process of presenting the media content stream to the user. If it is determined that the interaction indication information is set on a current position (a current media content) of the media content stream, the XR device may switch the current camera position of the user to the target camera position according to the interaction indication information, such that the user may interact with the interactive object in the media content stream in the interactive space of the target camera position.

Take one certain live concert as an example for illustration, assuming that the XR device determines that the media content stream decodes the interactive indication information at the position located by the $98^{th}$ frame of the media contents, then when the current camera position of the user is the camera position No. 4 and the target camera position is the camera position No. 1, the user may be switched to the camera position No. 1 from the camera position No. 4.

As another optional implementation, if the present application is to set the interactive indication information at any timeline node of the timeline, the XR device determines whether the interactive indication information is set on each timeline node or not in the process of presenting the media content stream to the user. If it is determined that the interactive indication information is set on a current timeline node, then the XR device may switch the current camera position of the user to the target camera position according to that interactive indication information, such that the user may interact with the interactive object in the media content stream in the interactive space of the target camera position.

Take one certain concert as an example for illustration, assuming that the interactive indication information is determined to be on the second timeline node, then when the current camera position of the user is the camera position No. 3 and the target camera position is the camera position No. 1, the user may be switched to the camera position No. 1 from the camera position No. 3.

It is considered that any one media content stream may be watched by a plurality of users at the same time, i.e., avatars of the plurality of users will be present in the virtual space. Then, when these avatars are switched to the target camera position and interact with the interactive objects in the interactive spaces of the target camera position, a plurality of avatars and interactive objects may be obstructed with each other, resulting in the users not being able to clearly see the interactive objects and/or their own avatars. Therefore, optionally in the present application, after switching the current camera position of the user to the target camera position, the visible scope of the target camera position may be set to only see its own avatar and the interactive object, so as to block out the avatars of other users, thereby ensuring that the users can watch their own avatars and the interactive objects without any obstruction, such that the users may obtain immersive interactive experience in which the interactive object interacts exclusively with themselves.

In some implementations, setting the corresponding interactive indication information at different positions in the media content stream can add interaction identification information into the media content stream through supplemental enhancement information (SEI) inserted at the different locations in the media content stream. For example, when actions of one certain interactive object at the $5^{th}$ minute, the $20^{th}$ minute, and the $30^{th}$ minute in the media content stream are interactive triggering actions, then the SEI may be inserted at the positions respectively corresponding to media content frames at the $5^{th}$ minute, the $20^{th}$ minute, and the $30^{th}$ minute of the media content stream, to achieve the purpose of adding the interactive identification information into the media content stream.

Herein, the SEI may be interactive information that is customarily set according to the media content stream, enabling the media content to have a wider range of usages. Moreover, the SEI in the present application may be packaged and sent together with streaming contents in the media content stream to realize the effect of synchronous sending and parsing of the SEI in the media content stream.

In this way, when a client terminal (the XR device) decodes the media content stream, each of the interactive indication information in the media content stream may be determined by the SEI inserted at the plurality of positions in the media content stream.

S103: presenting an interactive trigger zone and the interactive object in interactive space of the target camera position.

Optionally, the present application enables the user to interact with the interactive object located at the target camera position at a close distance based on the interactive trigger zone, by presenting the interactive trigger zone and the interactive object in the interactive space of the target camera position.

In the present application, the interactive trigger zone presented in the interactive space is optionally a zone having a certain thickness and transparency. The benefit of such a setting is that the problem of obstructing the interactive object due to the interactive trigger zone being an opaque zone will not occur. Herein, the thickness and transparency of the interactive trigger zone may be pre-defined, and no specific limitations are set thereon herein. For example, the thickness may be set to 3 millimeters, 5 millimeters, and so on, and the transparency may be set to 50%, 60%, 65%, and so on.

Figure 3:
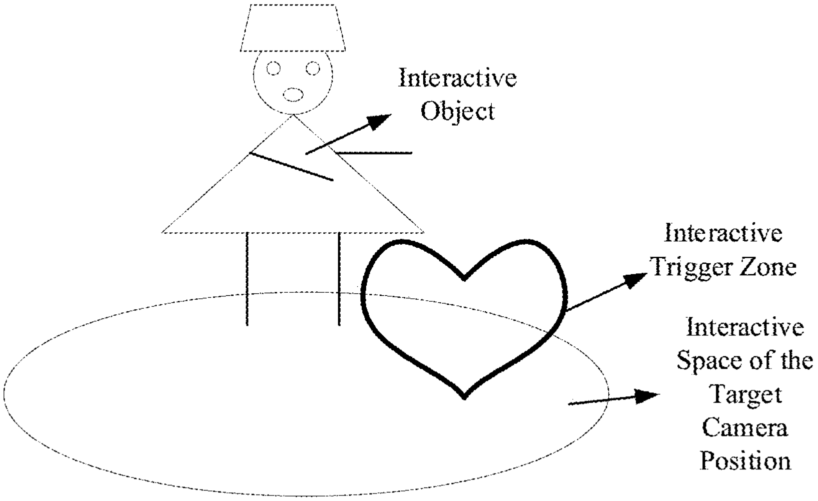
FIG. 3 is a schematic diagram of presenting an interactive trigger zone at a target camera position provided by embodiments of the present application.

Moreover, the above interactive trigger zone may be of any form, for example circular, heart-shaped, or other shapes, etc., which are not specifically limited herein. For example, as shown in FIG. 3, the interactive trigger zone is in the form of the heart-shaped.

S104: interacting with the interactive object according to the interactive trigger zone.

In embodiments of the present application, interacting with the interactive object includes at least one of interacting with the interactive object with a high-five; interacting with the interactive object with a hug; and interacting with the interactive object with a handshake. Other social etiquette interactive manners are surely included and thus are not specifically limited herein.

Considering that the interactive object located on the target camera position will perform some interactive actions, the user may perform the same action as the interactive action on the interactive trigger zone according to the interactive action performed by the interactive object, to accomplish the interactive operation with the interactive object.

In the present application, since the perspective of the target camera position is the perspective of the user when the user is located at the target camera position, the present application may be based on the interactive action performed by the interactive object which is photographed by the target camera position, and present the photographed interactive action to the user, such that watching the interactive action performed by the interactive object from the perspective of the user may be achieved, providing the user with an immersive interactive experience.

Exemplarily, assuming that the interactive action performed by an interactive object is: to move from the current position to the interactive trigger zone, and to perform the high-five action when arriving at the interactive trigger zone, based on the interactive action performed by the interactive object, the user may synchronously control his or her own avatar to move from his or her own position to the interactive trigger zone and perform the high-five action when arriving at the interactive trigger zone, thereby implementing an effective high-five with the interactive object on the interactive trigger zone.

Herein, the implementation of controlling the own avatar may be implemented optionally by utilizing a handheld device such as a joystick, a hand controller, or of course, gestures and the like, which are not limited herein.

In some achievable implementations, considering that the quantity of interactive objects may be more than one, when interacting with each interactive object according to the interactive trigger zone in the present application, the own avatar may be controlled to make the same action as the interactive action of each interactive object on the interactive trigger zone in sequence according to the interaction order of the plurality of interactive objects, in order to accomplish the interactive operation with all the interactive objects, so as to satisfy interactive needs of interacting with each interactive object for the user.

Exemplarily, assuming that the quantity of interactive objects is 10, being respectively interactive object 1, interactive object 2, interactive object 3, interactive object 4, interactive object 5, interactive object 6, interactive object 7, interactive object 8, interactive object 9, interactive object 10, when the interaction order is interactive object 5→interactive object 6→interactive object 7→interactive object 4→interactive object 3→interactive object 8→interactive object 9→interactive object 2→interactive object 1→interactive object 10, the user may control his or her own avatar to perform the same interactive action as each interactive action on the interactive trigger zone in sequence according to the interactive action performed by each interactive object based on the above interaction order, to perform the same action as each interactive action on the interactive trigger zone in sequence, to implement the interactive operation of the user with each interactive object.

It is considered that when interacting with the interactive object, there is usually a time limit and it is not always in the interactive state. Therefore, in order to ensure that the user is able to interact with the interactive object within effective interactive time, after presenting the interactive trigger zone and the interactive object in the interactive space of the target camera position in the present application, when the interactive object begins to move, the interactable time duration of the interaction with the interactive object is displayed on the border of the interactive trigger zone in a form of a highlight animation, so that the user may interact with the interactive object within the displayed interactable time duration, thus ensuring the smoothness and viewability of the media content stream.

Figure 4:
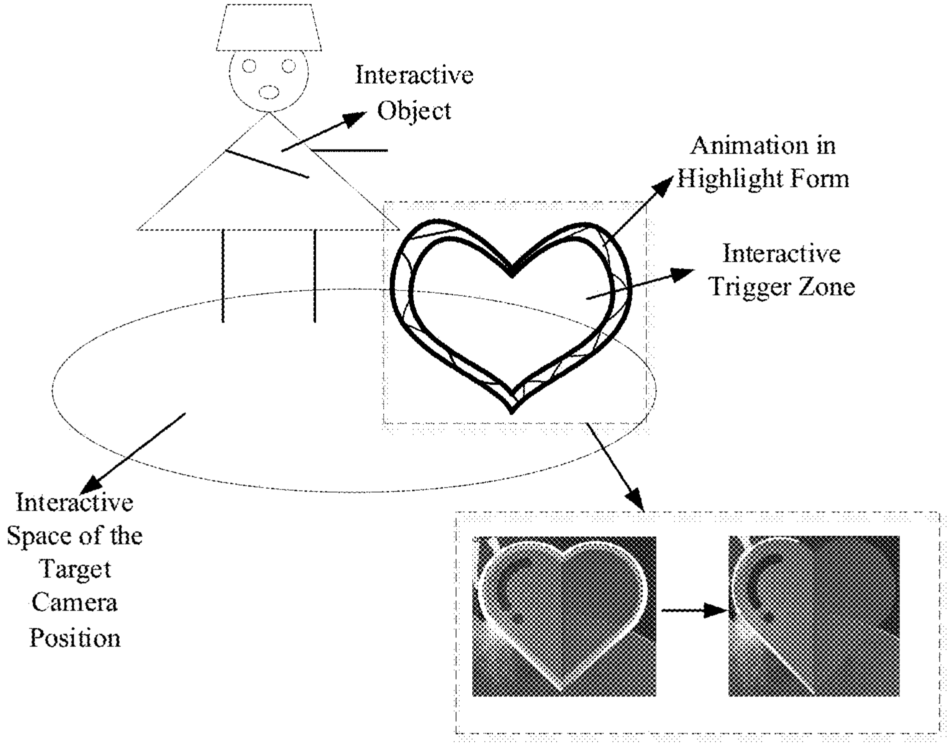
FIG. 4 is a schematic diagram of processing a border of an interactive trigger zone provided by embodiments of the present application.

Herein, the interactable time duration of the interaction with the interactive object is displayed on the border of the interactive trigger zone in the form of the highlight animation, which is shown in FIG. 4. Herein, the highlight part is the interactable time duration displayed by a form of down count timer animation.

It is understood that by setting the virtual camera position at which interaction occurs in the virtual space in which presents the media content stream, the present application switches the current camera position of the user to the camera position at which the interaction occurs (the target camera position) when interactive identification information is acquired in the process of presenting the media content stream, to enable the user to perform different types of interactions with the interactive object located in the interactive space of the target camera position based on the interactive trigger zone presented in the interactive space of the target camera position, such that it is able to enhance the interactivity of the user in the virtual space, improving the immersive interactive experience.

The method for virtual interaction provided by the embodiments of the present application switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction.

On the basis of the above embodiments, the present application further comprises optionally: when the user interacting with the interactive object is ended, presenting a special effect for the end of the interaction and interactive prompt information in the interactive space of the target camera position.

Optionally, in the process of the user interacting with the interactive object, the present application counts interactive objects with which the user interacts. In a case where it is counted that the user has accomplished the interactive operation with each interactive object, it is determined that the interaction is end. Otherwise, it is determined that the interaction is in process and at this time, performing the counting operation is continued until the user has interacted with each interactive object.

In a case where it is determined that the user has accomplished the interactive operation with each interactive object, the present application enables the user may watch the end effect of the interaction more intuitively by presenting the special effect for the end of the interaction and the interactive prompt information in the interactive space of the target camera position.

Figure 5:
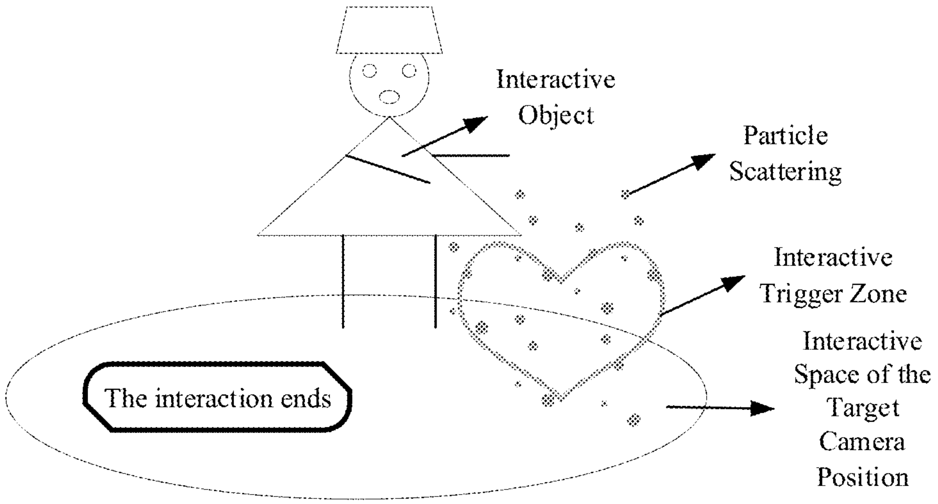
FIG. 5 is a schematic diagram for presenting a special effect for the end of the interaction and interactive prompt information in interactive space of a target camera position provided by embodiments of the present application.

To be exemplary, as shown in FIG. 5, the interactive prompt information of "The interaction ends" may be presented as well as a particle scattering special effect and the disappearance of the interactive trigger zone is controlled in the interactive space, so as to return to the normal watching state.

Further, after returning to the normal watching state, since the user is currently located in the interactive space of the target camera position, then when the user needs to continue to watch the media content stream from other perspectives, the user may open a map by using a way of the joystick or voice, etc., to switch the target camera position to a camera position from other perspective based on the map to continue to watch the media content stream, so as to be able to satisfy the need of the user to watch from different perspectives.

As some achievable implementations of the present application, in addition to presenting the interactive trigger zone and the interactive object in the interactive space of the target camera position, the present application may also present an interactive prop, to enable the user to interact with the interactive object on the interactive trigger zone with the aid of the interactive prop, thereby increasing the diversity and interest of the virtual interaction. The following provides a specific description of the process of interacting with the interactive object based on the interactive trigger zone and the interactive prop in the present application in conjunction with FIG. 6.

Figure 6:
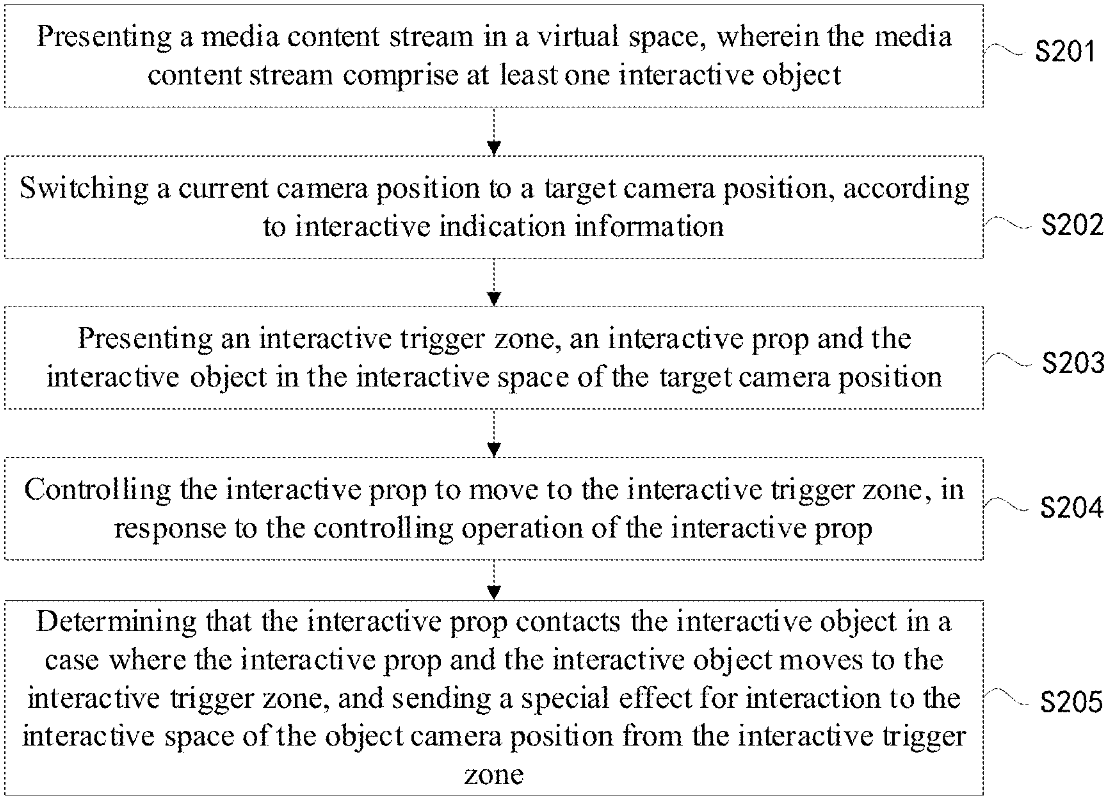
FIG. 6 is a schematic flow diagram of a second method for virtual interaction provided by embodiments of the present application.

As shown in FIG. 6, the method may comprise steps as below:

S201: presenting a media content stream in a virtual space, wherein the media content stream comprises at least one interactive object;

S202: switching a current camera position to a target camera position, according to interactive indication information;

S203: presenting an interactive trigger zone, an interactive prop and an interactive object in interactive space of the target camera position;

S204: controlling the interactive prop to move to the interactive trigger zone, in response to a controlling operation of the interactive prop; and

S205: determining that the interactive prop contacted the interactive object in a case where the interactive prop and the interactive object be moved to the interactive trigger zone, and sending a special effect for interaction from the interactive trigger zone to the interactive space of the object camera position.

Optionally, the present application enables the user to perform a close interaction with the interactive object located at the target camera position on the interactive trigger zone by manipulating the interactive prop, through presenting the interactive trigger zone, the interactive prop and the interactive object in the interactive space of the target camera position.

Figure 7:
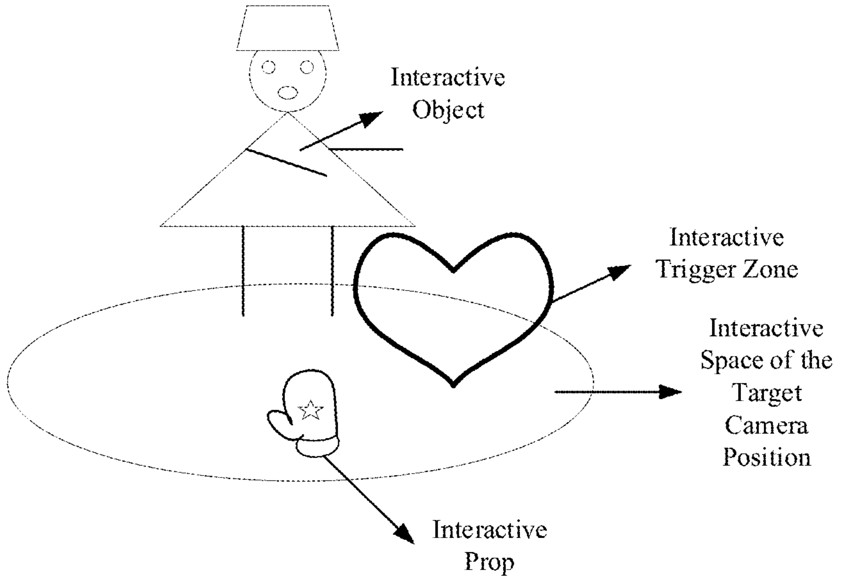
FIG. 7 is a schematic diagram of presenting an interactive prop at a target camera position provided by embodiments of the present application.

In the present application, the interactive prop may be of any form, for example the interactive prop being in the form of a star, etc., which is not specifically limited herein. For example, as shown in FIG. 7, the interactive trigger zone is in the form of a heart and the interactive prop is in the form of a hand.

It shall be understood that the present application may randomly select any form of interactive prop from a plurality of forms of interactive props to be presented in the interactive space of the target camera position at each time of an interactive scenario. In such way, the diversity of the display of the interactive prop can be increased, thereby improving the fun of the interaction.

In some achievable implementations, when the user interacts with the interactive object located in the target camera position on the interactive trigger zone by manipulating the interactive prop, the user may control the interactive prop in the interactive space to move to the interactive trigger zone by a way of the handheld device such as the joystick etc., in the process of moving the interactive object to the interactive trigger zone. When both the interactive prop and the interactive object have been moved to the interactive trigger zone, it is indicated that the interactive prop and the interactive object contact each other, and at this time, the special effect for interaction is sent to the interactive space of the target camera position from the interactive trigger zone to present an feedback effect for interaction with the interactive object to the user, thereby further improving the immersive interactive experience of the user in the virtual space.

That is, when the controlling operation of the interactive prop of the user is detected, the interactive prop is controlled to be moved to the interactive trigger zone according to the controlling operation of the user, thereby implementing the interaction with the interactive object in the interactive trigger zone by utilizing the interactive prop.

In the present application, when sending the special effect for interaction to interactive space of the target camera position, optionally any special effect for interaction is randomly selected from a pre-set library of special effects for interaction according to the type of the interaction as a target special effect for interaction, and the target special effect for interaction is controlled to send to the interactive space from the interactive trigger zone.

Herein, the library of special effects for interaction may be pre-built and include different types of special effects for interaction, such as a heart-shaped special effect, a finger heart special effect, a bow special effect, a handshake special effect, a rose special effect, a particle special effect, a bow special effect+a heart-shaped special effect, and an special effect that is a combination of any of the special effects for interaction, and the like.

Figure 8:
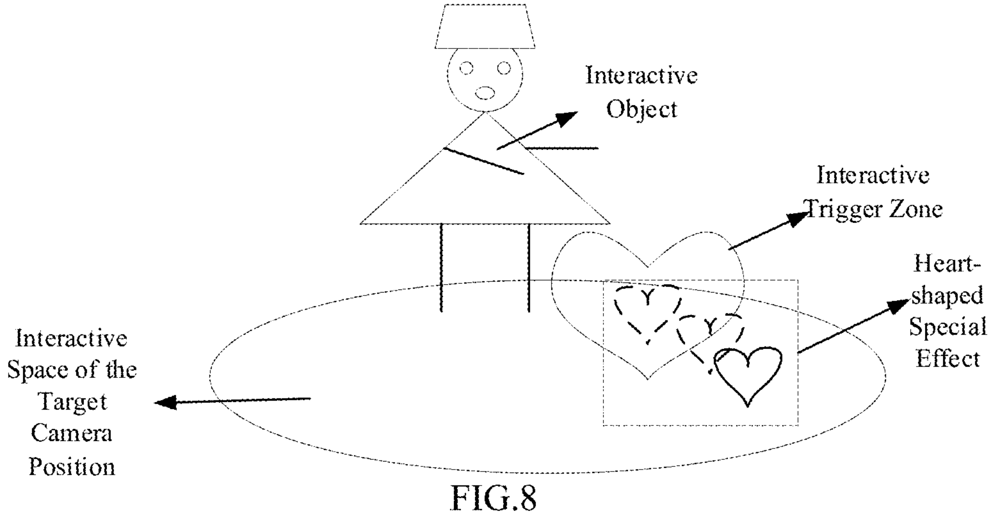
FIG. 8 is a schematic diagram of sending a special effect for interaction after an interaction with an interactive object provided by embodiments of the present application.

To be exemplary, as shown in FIG. 8, assuming that the interaction of the user with the interaction object is a high-five interaction, the heart-shaped special effect in the library of special effects for interaction that has a corresponding relationship with the high-five interaction may be used as the target special effect for interaction and the heart-shaped special effect is sent to the interactive space from the interactive trigger zone.

In order to enhance the authenticity of the immersive experience of the user, the present application sends the special effect for interaction to the interactive space of the target camera position while outputting a first vibration feedback and a first sound effect feedback corresponding to the special effect for interaction to the user. To be exemplary, if the special effect for interaction is the heart-shaped special effect, the vibration feedback corresponding to the heart-shaped special effect is output to the user through a handheld device such as a joystick etc., and the sound effect feedback corresponding to the heart-shaped special effect is output to the user through a speaker on the XR device at the same time. Whereby, the feedback for the interaction to the user may be implemented from three dimensions of vision, touch and hearing, so that the user can have an immersive interactive experience.

It shall be noted that the first vibration feedback and the first sound effect feedback corresponding to the special effect for interaction in the present application are predetermined and stored in the XR device. That is, when the first vibration feedback and the first sound effect feedback corresponding to the special effect for interaction need to be output to the user, a vibration feedback and a sound effect feedback which have a mapping relationship with the special effect for interaction are searched in a pre-set list of mapping relationships based on the special effect for interaction, and the searched vibration feedback and the sound effect feedback are then used as the target first vibration feedback and the target first sound effect feedback, and the target first vibration feedback and the target first sound effect feedback are output to the user.

It is worth noting that the first vibration feedback and the first sound feedback described above may also be updated or adjusted periodically to meet the use needs of different periods.

The method for virtual interaction provided by the embodiments of the present application switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction. In addition, by presenting an interactive prop in the interactive space of the target camera position, the user may interact with the interactive object on the interactive trigger zone with the aid of the interactive prop, thereby enriching the diversity and interest of the virtual interaction. Further, when the user interacts with the interactive object successfully, a special effect for interaction is sent from the interactive trigger zone to the interactive space of the camera position at which the interaction occurs to present visual feedback for the interaction to the user, so that the user is able to know that the interaction with the interactive object has succeed based on the special effect for interaction, which may further improve the immersive interactive experience of the user in the virtual space.

In some achievable implementations, considering that the user controls the interactive prop to contact with the interactive object, before presenting the special effect for interaction on the interactive trigger zone, the present application, optionally, may also present a special effect for trigger on the interactive trigger zone, to highlight the scenario that the interactive prop has contacted the interactive object successfully to the user, enabling the user to determine that himself or herself has interacted with the interactive object successfully. The following illustrates presenting a special effect for trigger on an interactive trigger zone in the present application in conjunction with FIG. 9, specifically.

Figure 9:
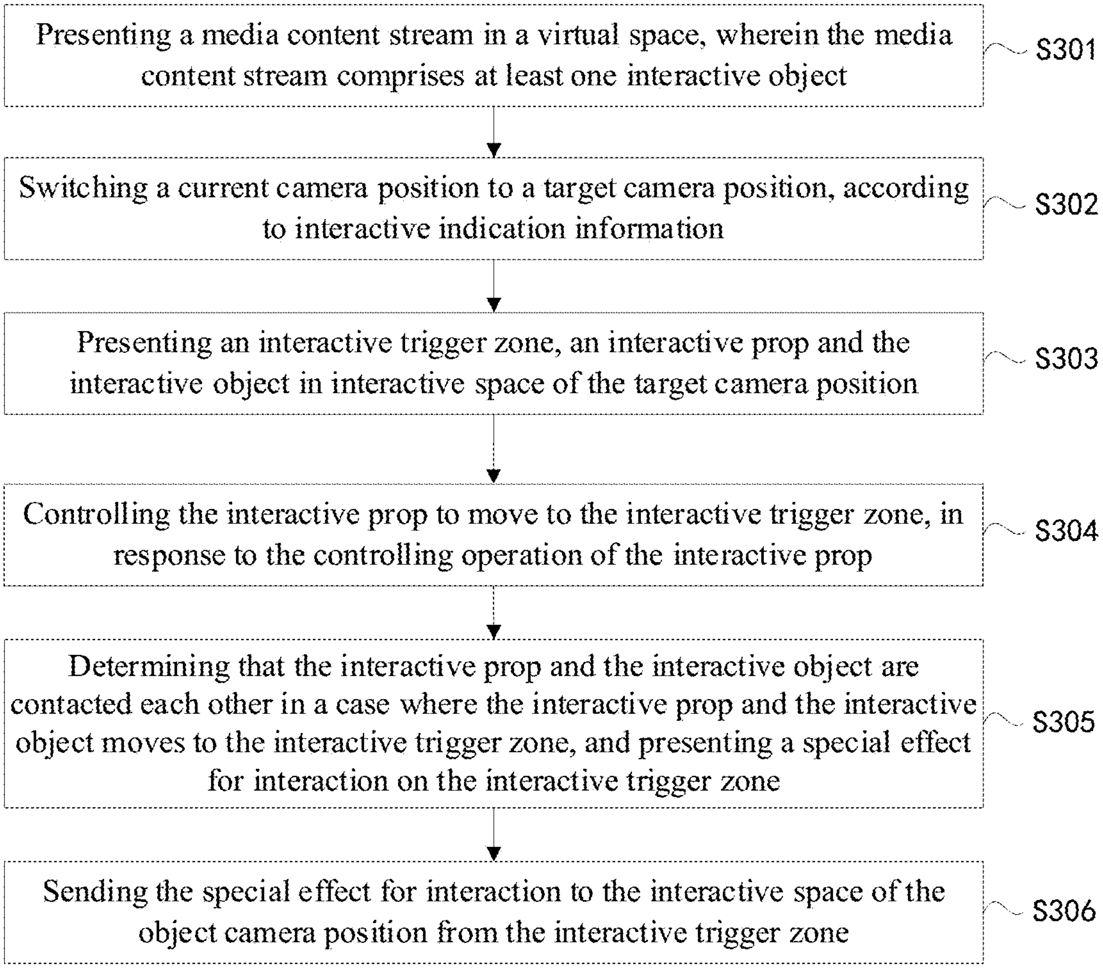
FIG. 9 is a schematic flow diagram of a third method for virtual interaction provided by embodiments of the present application.

As shown in FIG. 9. the method may comprise steps as below:

- S301: presenting a media content stream in a virtual space, wherein the media content stream comprises at least one interactive object;
- S302: switching a current camera position to a target camera position, according to interactive indication information;
- S303: presenting an interactive trigger zone, an interactive prop and an interactive object in interactive space of the target camera position;
- S304: controlling the interactive prop to move to the interactive trigger zone, in response to a controlling operation of the interactive prop; and
- S305: determining that the interactive prop and the interactive object contact each other in a case where the interactive prop and the interactive object move to the interactive trigger zone, and presenting a special effect for trigger on the interactive trigger zone.

Figure 10:
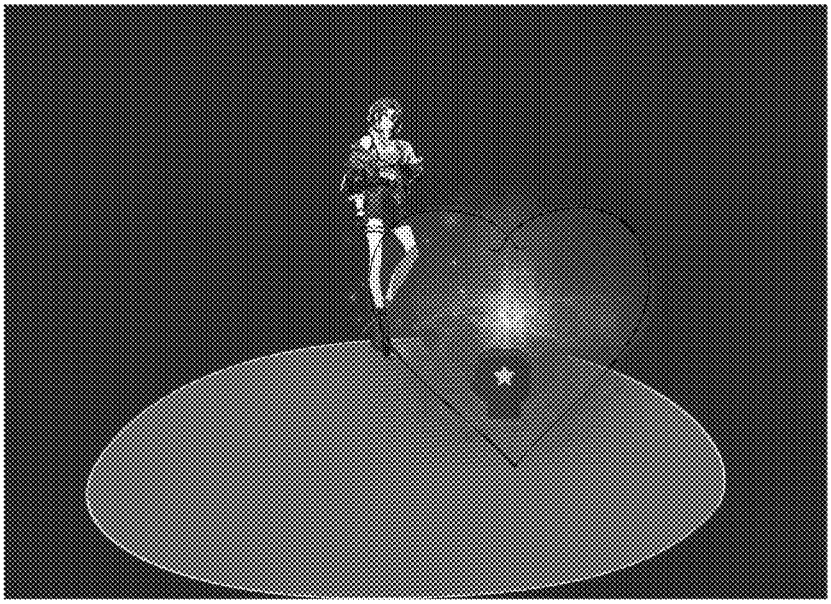
FIG. 10 is a schematic diagram of presenting a special effect for trigger in an interactive trigger zone provided by embodiments of the present application.

As shown in FIG. 10, assuming that the interactive prop is a hand prop, the interactive trigger zone is a heart-shaped trigger zone, the interactive object is a virtual artist, and the type of the interaction is a high-five interaction, when the hand prop and the virtual artist are both detected to be located in the heart-shaped trigger zone, it is determined that the hand prop and the virtual artist contact each other through the heart-shaped trigger zone, i.e., the user successfully high-fives the virtual artist. At this time, a special effect enlarging the heart-shaped trigger zone is presented on the heart-shaped trigger zone to present a visual effect of the user performing high-five with the virtual artist to the user.

Or for example, assuming that the interactive prop is a humanoid prop, the interactive trigger zone is a heart-shaped trigger zone, the interactive object is a virtual artist, and the interactive type is a hugging interaction, when the humanoid prop and the virtual artist are both detected to be located in the heart-shaped trigger zone, it is determined that the humanoid prop and the virtual artist contact each other through the heart-shaped trigger zone, i.e., the user and the virtual artist hug successfully. At this time, a hugging special effect is presented on the heart-shaped trigger zone to present the visual effect of the own avatar of the user hugging the virtual artist to the user.

In some achievable implementations, the present application may also output a second vibration feedback and a second sound effect feedback corresponding to the special effect for trigger to the user at the same time as the present application presenting the special effect for trigger on the interactive trigger zone, thereby further enhancing the immersive interactive experience. To be exemplary, if the special effect for trigger is the special effect for enlarging the heart-shaped trigger zone, the vibration feedback corresponding to the special effect for enlarging the heart-shaped trigger zone is output to the user through a handheld device such as a joystick etc., and the sound effect feedback corresponding to the special effect for enlarging the heart-shaped trigger zone is output to the user through a speaker on the XR device. The vibration feedback may be a strong vibration feedback.

It is noted that the second vibration feedback and the second sound effect feedback corresponding to the special effect for trigger in the present application are predetermined and stored in the XR device. In other words, when the second vibration feedback and the second sound effect feedback corresponding to the special effect for trigger are need to be output to the user, a vibration feedback and a sound effect feedback having a mapping relationship with the special effect for trigger is searched in a pre-set list of mapping relationships based on the special effect for trigger, the searched vibration feedback and sound effect feedback are used as a target second vibration feedback and a target second sound effect feedback, and the target second vibration feedback and the target second sound effect feedback are output to the user.

It is worth noting that the second vibration feedback and the second sound effect feedback described above, may also be updated and adjusted periodically, to meet the use needs of different periods.

S306: a special effect for interaction is sent to the interactive space of the object camera position.

The method for virtual interaction provided by the embodiments of the present application switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction. In addition, a scenario that the interactive prop has contacted the interactive object successfully is highlighted to the user by presenting a special effect for trigger on the interactive trigger zone, causing the user to determine that himself or herself has interacted with the interactive object successfully, whereby the feedback for the interaction may be performed for the user from three dimensions of vision, touch and hearing, further enhancing the immersive interactive experience of the user in the virtual space.

In some achievable implementations, considering that during the process of the user interacting with the interactive object, it is possible to have a plurality of interactions within the interactable time duration, i.e., a plurality of contacts. Thus, when sending the special effect for interaction from the interactive trigger zone to the interactive space of the target camera position, it is required to send special effects for interaction corresponding to the number of the plurality of contacts in the interactive space based on the plurality of contacts of the user and the interactive object in one interaction, to present a plurality of consecutive feedbacks for the interaction to the user. The following will explain and illustrate the process of sending the plurality of consecutive special effects for interaction to the interactive space of the target camera position according to the plurality of contacts of the user and the interactive object in one interaction provided above by the present application in conjunction with FIG. 11.

Figure 11:
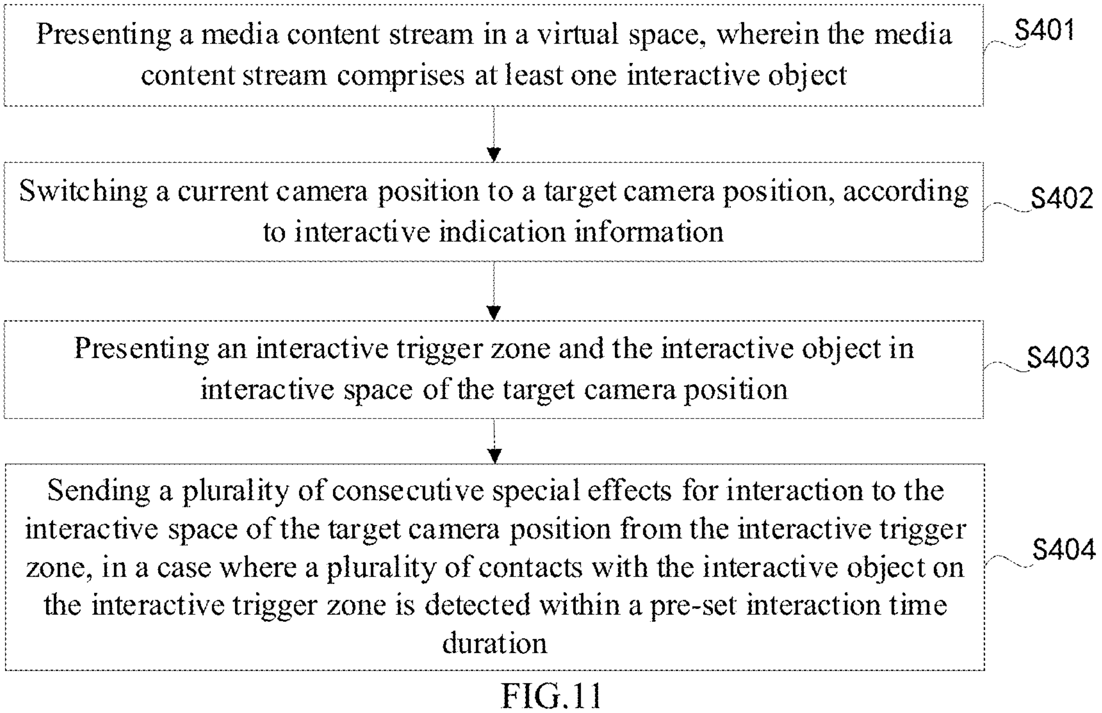
FIG. 11 is a schematic flow diagram of a fourth method for virtual interaction provided by embodiments of the present application.

As shown in FIG. 11, the method may comprise steps as below:

- S401: presenting a media content stream in a virtual space, wherein the media content stream comprises at least one interactive object;
- S402: switching a current camera position to a target camera position, according to interactive indication information;
- S403: presenting an interactive trigger zone and the interactive object in interactive space of the target camera position; and
- S404: sending a plurality of consecutive special effects for interaction to the interactive space of the target camera position from the interactive trigger zone, in a case where a plurality of contacts with the interactive object on the interactive trigger zone is detected within a pre-set interaction time duration.

Figure 12:
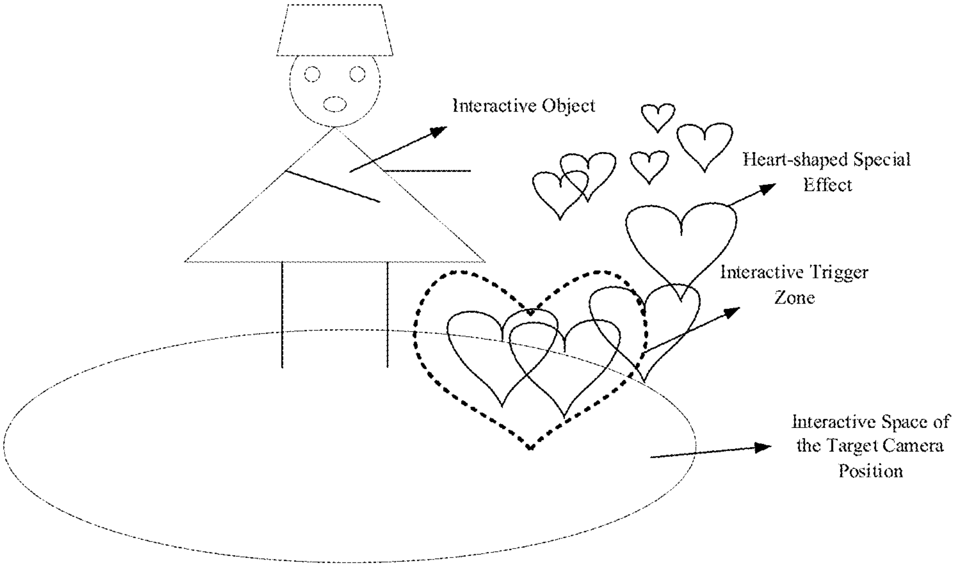
FIG. 12 is a schematic diagram of sending a plurality of consecutive special effects for interaction to interactive space of a target camera position provided by embodiments of the present application.

Considering that when the user performing virtual interaction with any interactive object, it is possible to have a plurality of interactions with the interactive object within the interactable time duration, i.e., a plurality of contacts, at this time, the present application may implement an effect of consecutive interactions by selecting a target special effect for interaction from a library of special effects for interaction based on the plurality of contacts with the interactive object and sending the same quantity of special effects for interaction as the quantity of the plurality of interactions to the interactive space of the target camera position from the interactive trigger zone. For example, a plurality of target heart-shaped special effects are sent to the interactive space of the target camera position, as shown in FIG. 12.

In addition, at the same time as sending the plurality of the special effects for interaction to the interactive space of the target camera position, optionally consecutive vibration feedbacks and consecutive sound effect feedbacks corresponding to the special effect for interaction are also output to the user, thereby implementing consecutive feedbacks for the interaction to the user from three aspects of vision, hearing and touch, enabling the user to have an immersive interactive experience.

In order to better reflect the connection feedback effect, the present application, when sending the plurality of consecutive special effects for interaction to the interactive space of the target camera position, optionally one special effect for interaction is sent upon the first interaction, and upon the second or more interactions, two or more consecutive special effects for interaction are sent.

In some achievable implementations, when the quantity of interactive objects is more than one, the present application optionally set a corresponding interaction time duration for each interactive object to make sure that the user can interact with each interactive object. Considering that the first interactive object is the initial interactive object, the user may not be able to interact with the first interactive object effectively in a timely and correct manner, while the user clearly know how to interact with the other interaction objects effectively since the user has already interacted with the first interaction object. Therefore, the present application may set a longer interaction time duration for the first interactive object according to the order of the interactive objects, so that the user may have sufficient time to interact with the first interactive object effectively when interacting with the first interactive object. The same interaction time duration is set for the other interactive objects, and the interaction duration is usually shorter than the interaction time duration of the first interactive object. For example, the interaction time duration of the first interactive object may be set to a, and the interaction time duration of the other interactive objects may be set to b, wherein a>b.

Take one certain concert as an example for illustration, assuming the quantity of artists in the concert is 3, respectively being artist A, artist B, and artist C. Then, when the artist A is the first interactive object, the artist B is the second interactive object, and the artist C is the third interactive object, an interaction time duration of 8 seconds for the artist B is set, and an interaction time duration of 3 seconds for the artist A and C is set according to experimental statistics. Thus, the user may perform a plurality of interactions with the artist B in the interaction time duration of 8 seconds, and perform a plurality of interactions with the artist A and artist C in the interaction time duration of 3 seconds.

The method for virtual interaction provided by the embodiments of the present application switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction. In addition, when it is determined that the user perform a plurality of interactions with an interactive object within one interactive time duration, a plurality of consecutive special effects for interaction is sent to the interactive space of the target camera position in order to present a consecutive effect for interaction to user, so as to satisfy the consecutive interaction need of the user.

In some achievable implementations, considering that the way of switching the current camera position to the target camera position based on the interactive indication information may not meet the personalized usage need of the user. For example, the user does not want to interact with the interactive object at this time, and then if the current camera position is directly switched to the target camera position, it is caused that the user does not have the interactive initiative, which leads to a poor interactive experience. Thus, the present application enables the user to actively determine whether it is needed to interact with the interactive object based on an interactive prompt interface by presenting the interactive prompt interface to the user before switching the current camera position to the target camera position, so that the user has the control right when performing interactive operation with the interactive object, thereby improving the immersive interactive experience for the user.

The implementing process of presenting the interactive prompt interface to the user before switching the current camera position to the target camera position provided above by the present application is illustrated in detail in conjunction with FIG. 13 as below.

Figure 13:
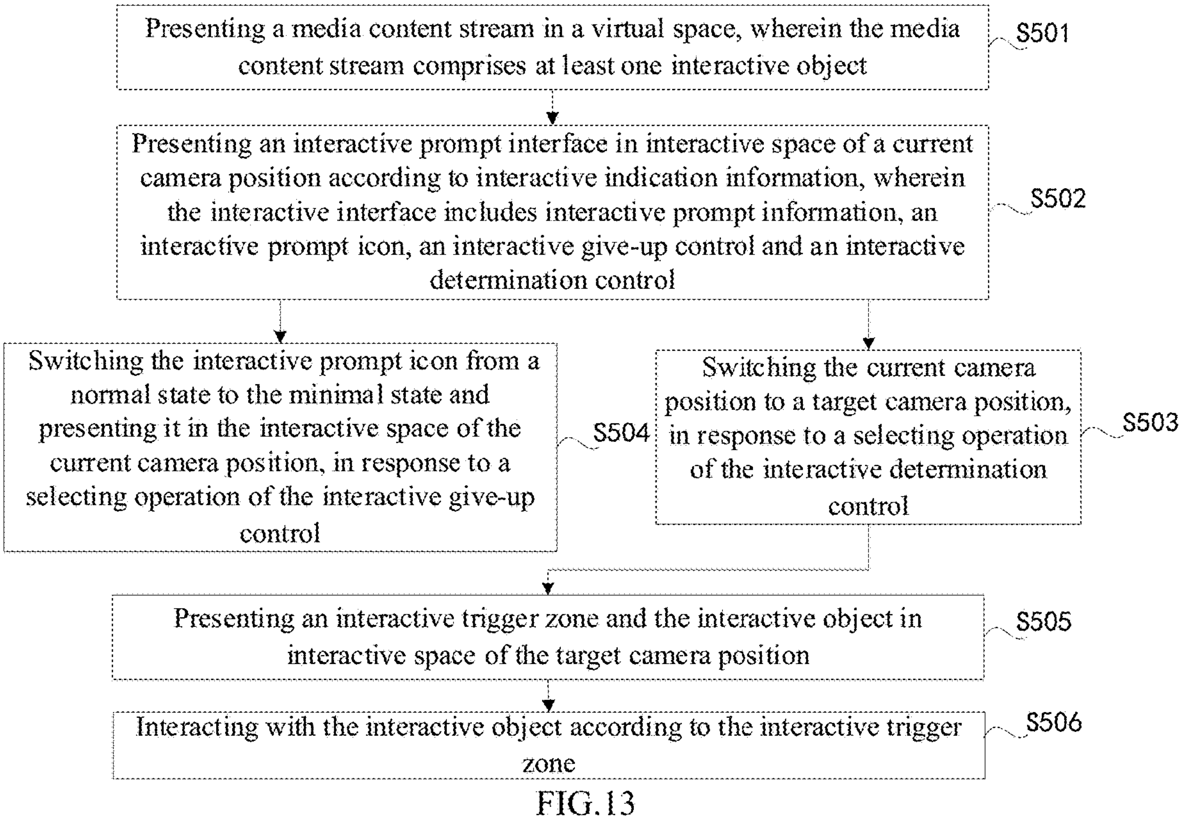
FIG. 13 is a schematic flow diagram of a fifth method for virtual interaction provided by embodiments of the present application.

As shown in FIG. 13. the method may comprise steps as below:

S501: presenting a media content stream in a virtual space, wherein the media content stream comprises at least one interactive object;

S502: presenting an interactive prompt interface in interactive space of a current camera position according to interactive indication information, wherein the interactive prompt interface includes: interactive prompt information, an interactive prompt icon, an interactive give-up control and an interactive determination control;

S503: switching the current camera position to a target camera position, in response to a selecting operation of the interactive determination control;

S504: switching the interactive prompt icon from the normal state to the minimal state and presenting it in the interactive space of the current camera position, in response to a selecting operation of the interactive give-up control.

Optionally, during the process of presenting the media content stream, if the interactive indication information is detected, the present application determines to enter the interactive scenario. At this time, the user is enabled to determine whether the interactive scenario is needed or not based on the prompt information and the interactive control in the interactive prompt interface by presenting the interactive prompt interface in the interactive space of the current camera position, enabling the user to have the control right of interaction with the interactive object based on the interactive prompt interface, so as to satisfy the operation requirements of the user in different watching scenarios.

Figure 14A:
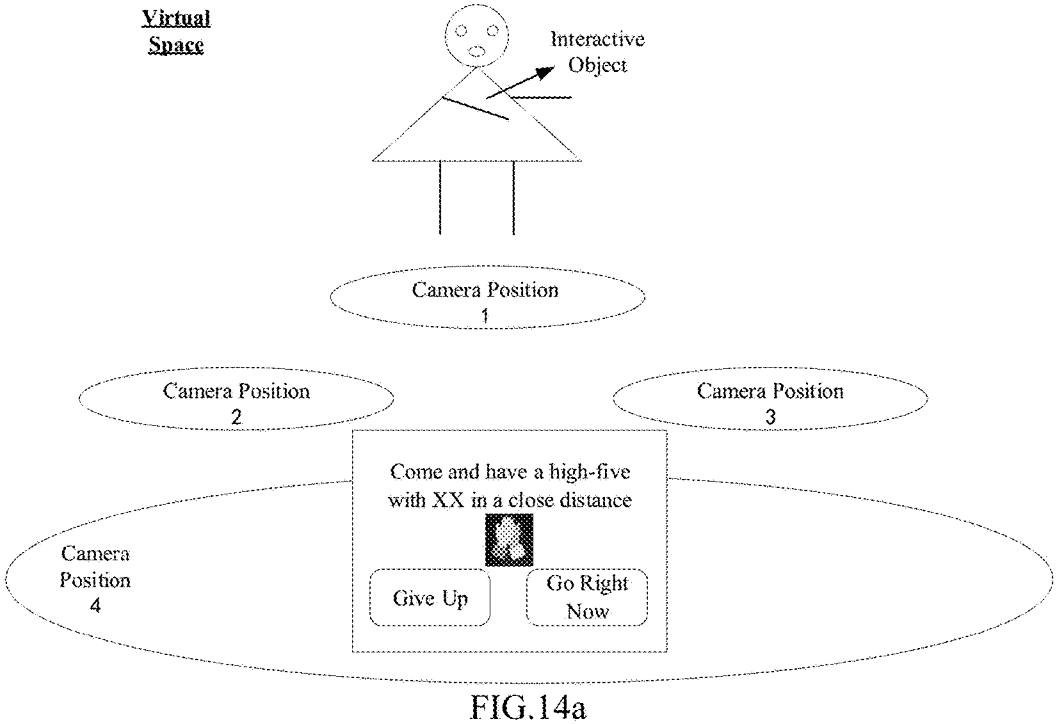
FIG. 14*a* is a schematic diagram of presenting an interactive prompt interface in interactive space of a current camera position provided by embodiments of the present application.
Figure 14B:
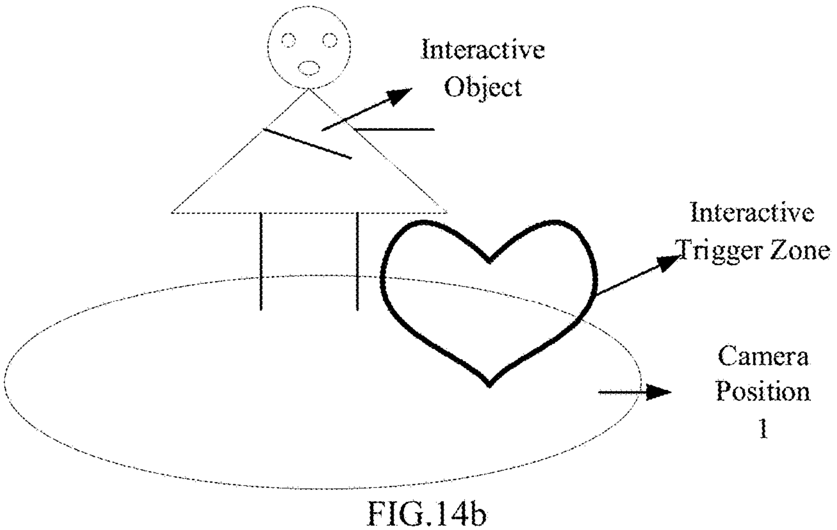
FIG. 14*b* is a schematic diagram of a camera position switching after the selection of an interaction determination control provided by embodiments of the present application.
Figure 14C:
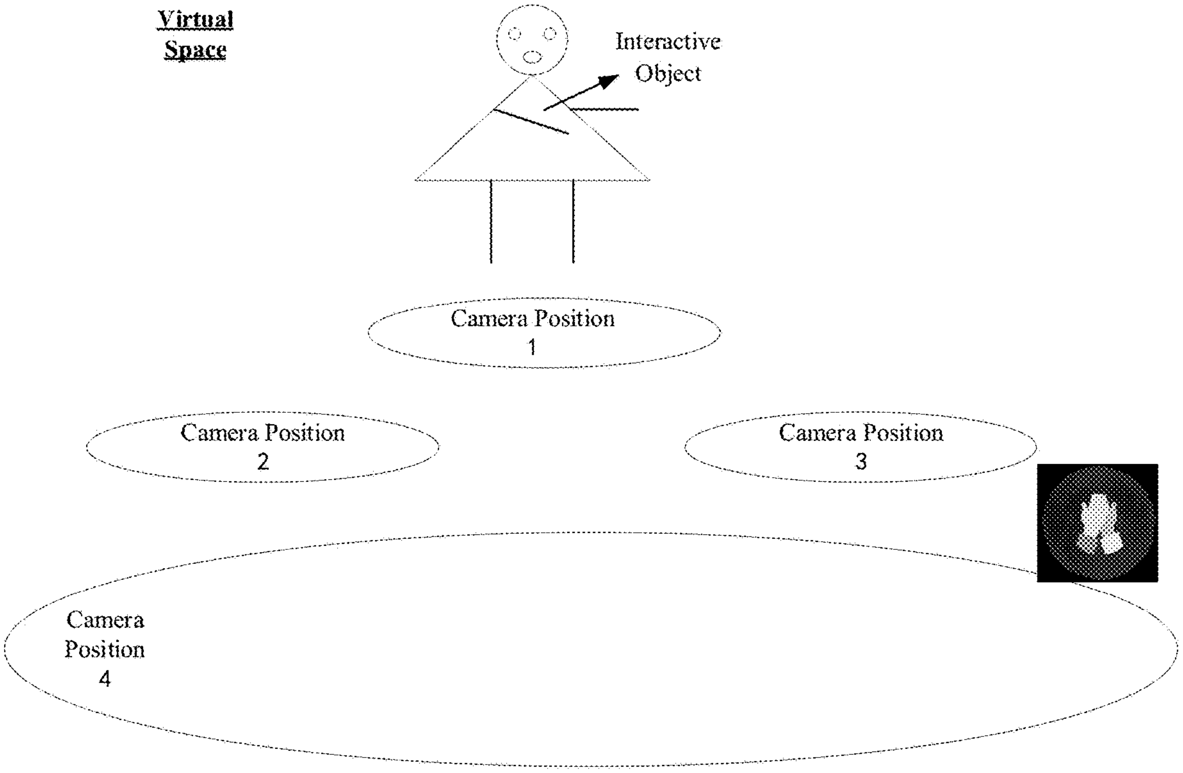
FIG. 14*c* is a schematic diagram of scaling down and displaying an interactive prompt image provided by embodiments of the present application.

To be exemplary, as shown in FIG. 14*a*, the interactive prompt interface is presented in the interactive space of the current camera position 4, the interactive prompt information in the interactive prompt interface is “Come and have a high-five with XX in a close distance”, the interactive prompt image is a high-five icon and the interactive determination control is “Go Right Now”. Then, the current camera position of the user is switched to the target camera position when the interactive determination control being selected by the user is detected, which indicates the user wants to interact with the interactive object in a close distance, wherein the interactive space corresponding to the target camera position is as shown in FIG. 14*b*. The high-five icon in the interactive prompt interface is switched from the normal state to the minimal state and the high-five icon in the minimal state is displayed in the right side of the interactive space of the current camera position as shown in FIG. 14*c*, when the interactive give-up control being selected by the user is detected, which indicates that the user does not want to interact with the interactive object at this time.

Herein, the display position of the interactive prompt icon in the minimal state in the interactive space of the current camera position, may be adjusted flexibly according to the perspective of the camera position at which the user currently located, which preferably displays on a position without obstructing any objects, and there is not specifically limited herein.

Figure 15:
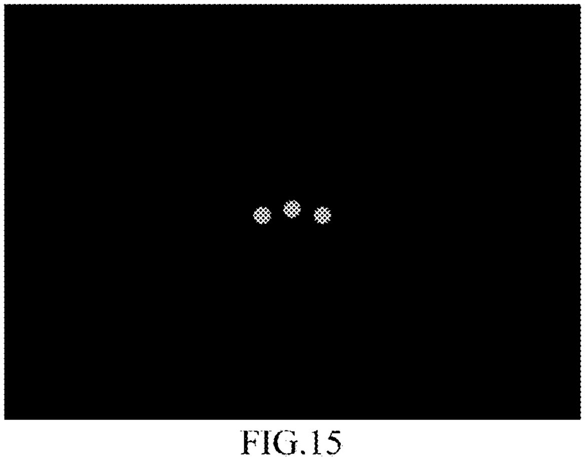
FIG. 15 is a schematic diagram of a transition interface presented in interactive space of a current camera position provided by embodiments of the present application.

In the above example, when the current camera position is switched to the target camera position, a transition interface may be presented in the interactive space of the current camera position to make a transition through the transition interface when the current camera position is switched to the target camera position, making the transition more natural. Herein, the transition interface may be based on the closed-eye and open-eye animation to implement the transition effect, as shown in FIG. 15.

Considering that the user may regret not interacting with the interactive object after giving up interacting with the interactive object, at this time, the user may control the cursor or other props (e.g., a magic wand or a bushel fan, etc.) to select the interactive prompt image in the minimal state to trigger a camera position switching operation, such that the XR device switches the current camera position to the target camera position according to the triggering operation, whereby the user may interact with the interactive object in the interactive space of the target camera position.

In some achievable implementations, before presenting the interactive prompt interface in the interactive space of the current camera position, optionally the present application may also present an animation special effect for interactive prompt in the interactive space of the current camera position, enabling the user to know he/she is about to enter the scenario where he/she interacts with the interactive object based on the animation special effect for interactive prompt.

Figure 16:
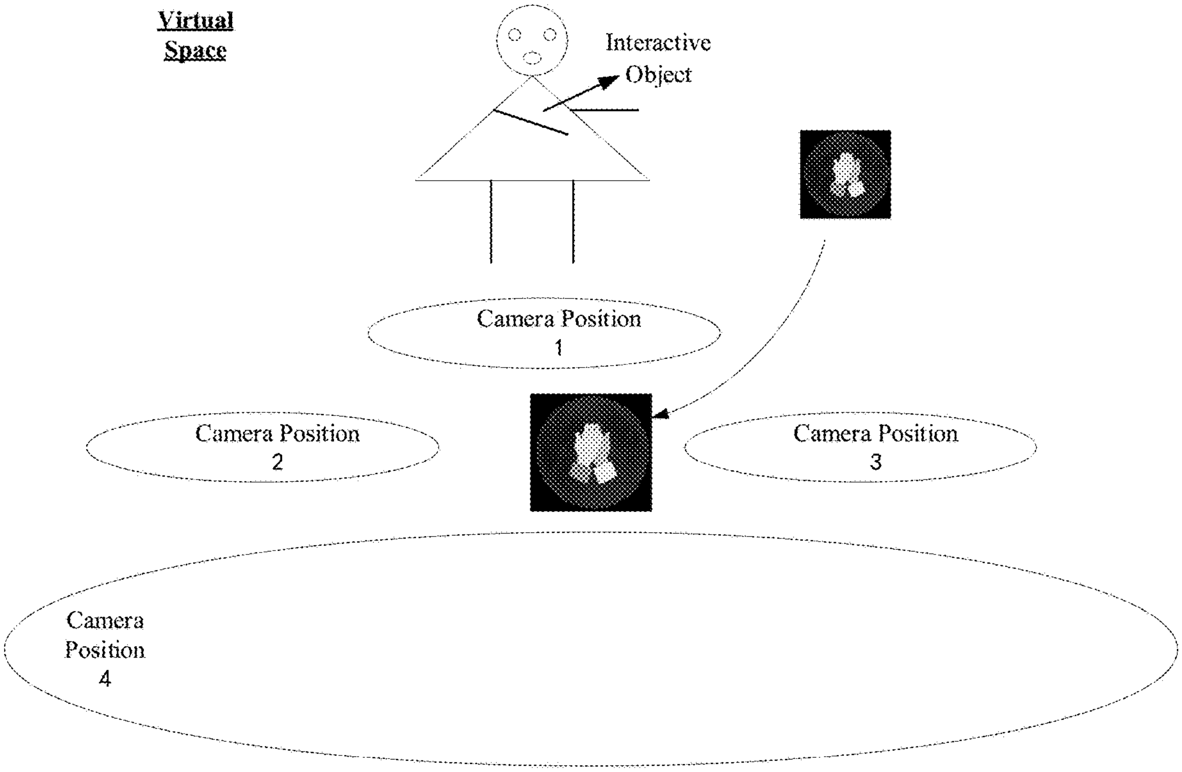
FIG. 16 is a schematic diagram of presenting an animation special effect for interactive prompt in interactive space of a current camera position provided by embodiments of the present application.

To be exemplary, assuming that the animation effect for interactive prompt is a high-five animation effect, the animation effect for interactive prompt presented in the interactive space of the current camera position may be shown in FIG. 16.

S505: presenting an interactive trigger zone and the interactive object in interactive space of the target camera position.

S506: interacting with the interactive object according to the interactive trigger zone.

The method for virtual interaction provided by the embodiments of the present application switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction. In addition, before switching the current camera position to the target camera position, the present application enables the user to be able to have a control over whether him or her need to interact with the interactive object in the media content stream by presenting the interactive prompt interface in the interactive space of the current camera position, thereby meeting the personalized usage need of the user and further improving immersive interactive experience for the user.

In some achievable implementations, considering that after presenting the interactive trigger zone and the interactive object in the interactive space of the target camera position, it is possible that the user does not know how to interact with the interactive object based on the presented interactive trigger zone. Therefore, after presenting the interactive trigger zone and the interactive object in the interactive space of the target camera position, optionally the present application may also present interactive guidance information around the interactive trigger zone, enabling the user, based on the guidance information, know how to interact with the interactive object based on the interactive trigger zone.

Figure 17:
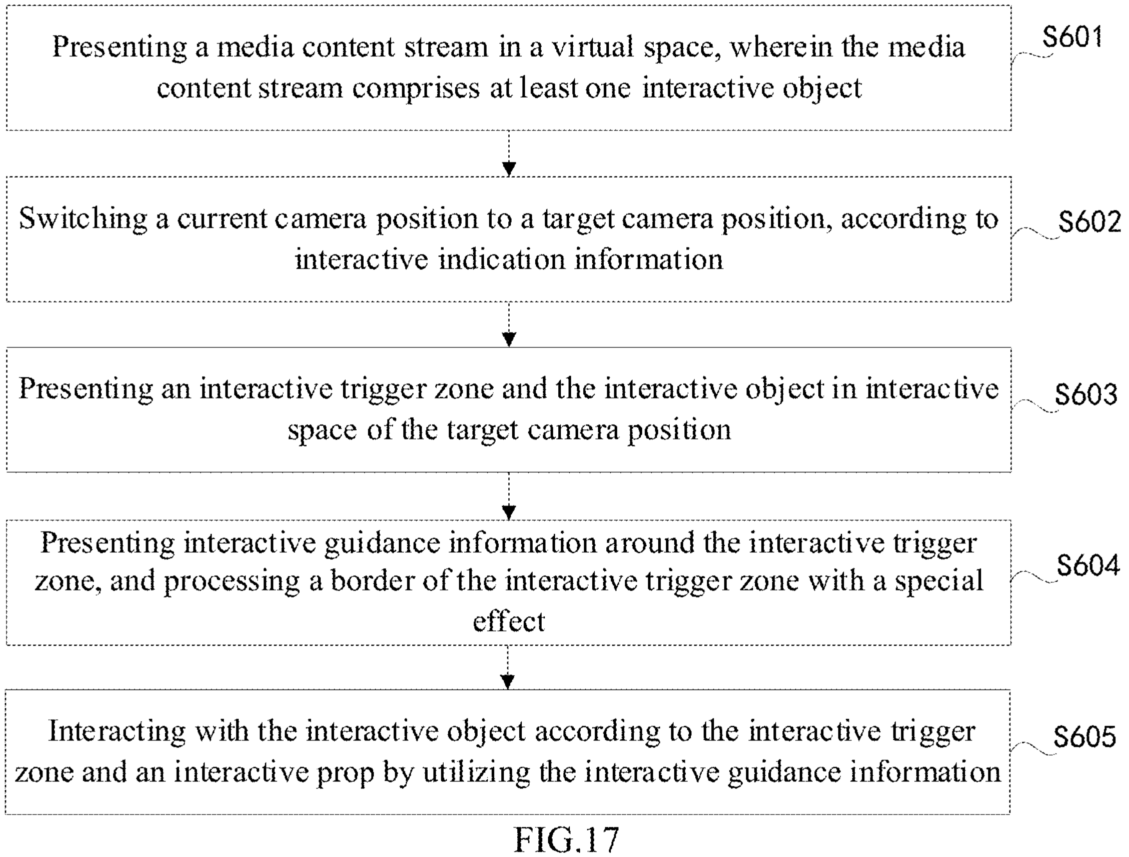
FIG. 17 is a schematic flow diagram of a sixth method for virtual interaction provided by embodiments of the present application.

The following illustrates the process of presenting the interactive guidance information around the interactive trigger zone provided by the present application in detail in conjunction with FIG. 17. As shown in FIG. 17, the method may comprise the steps as below:

S601: presenting a media content stream in a virtual space, wherein the media content stream comprises at least one interactive object.

S602: switching a current camera position to a target camera position, according to interactive indication information.

S603: presenting an interactive trigger zone and the interactive object in interactive space of the target camera position.

S604: presenting interactive guidance information around the interactive trigger zone, and processing a border of the interactive trigger zone with a special effect.

Optionally, the interactive guidance information may be presented around the interactive trigger zone with the pre-set display mode. For example:

in mode 1, the interactive guidance information is flown into the interactive trigger zone in a clockwise direction starting from any position behind the interactive trigger zone and is hovered at a pre-set position in the interactive trigger zone.

Herein, the pre-set position may be any vertex position or center position, which is not limited herein.

Figure 18:
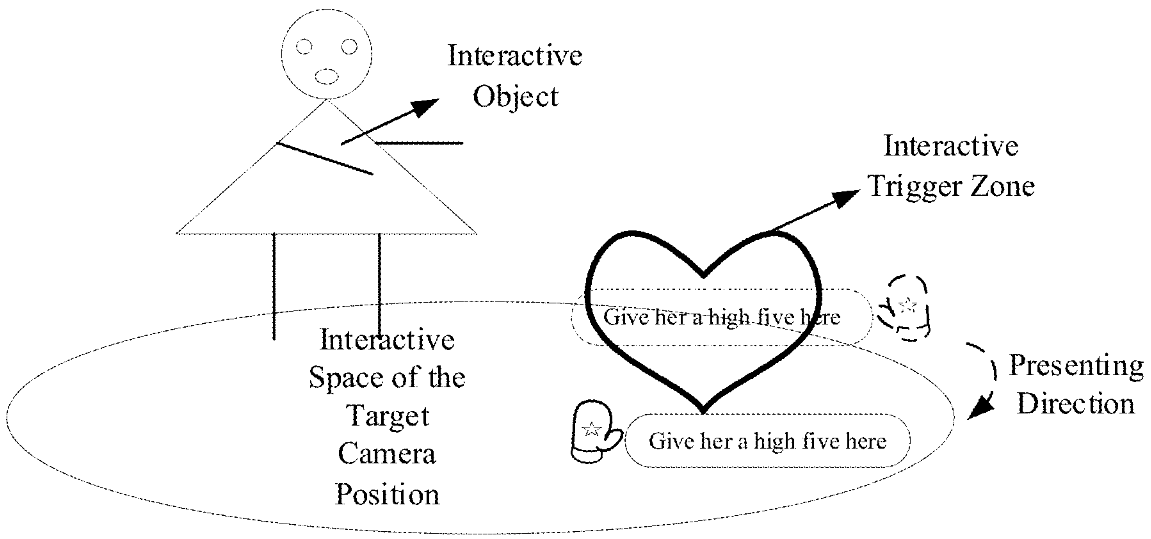
FIG. 18 is a schematic diagram of presenting interactive guidance information around an interactive trigger zone provided by embodiments of the present application.

For example, as shown in FIG. 18, assuming that the interactive trigger zone is a heart-shaped trigger zone, and the interactive guidance information is “Give her a high five here”, the “Give her a high five here” is flown into the heart-shaped trigger zone in the clockwise direction from any position behind the heart-shaped trigger zone and is hovered at a position under the heart-shaped trigger zone.

In mode 2, the interactive guidance information is presented in the center of the interactive trigger zone.

When presenting the interactive guidance information in the present application, the border of the interactive trigger zone may be processed with the special effect, such that the special effect based processed border can highlight the interactive trigger zone where the interaction may perform, making it easy for the user to find out in which zone to interact with the interactive object.

Herein, processing the border of the interactive trigger zone with the special effect, optionally displays the border with highlight or bold etc., which is not specifically limited herein.

S605: interacting with the interactive object according to the interactive trigger zone and an interactive prop by utilizing the interactive guidance information.

The method for virtual interaction provided by the embodiments of the present application switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction. In addition, the user is enabled to more quickly and accurately grasp the implementation of the interaction with the interactive object by displaying interactive guidance information around the interactive trigger zone, and processing of the border of the interactive trigger zone with the special effect, so as to improve the effectiveness and usability of the interaction between the user and the interactive object.

Figure 19:
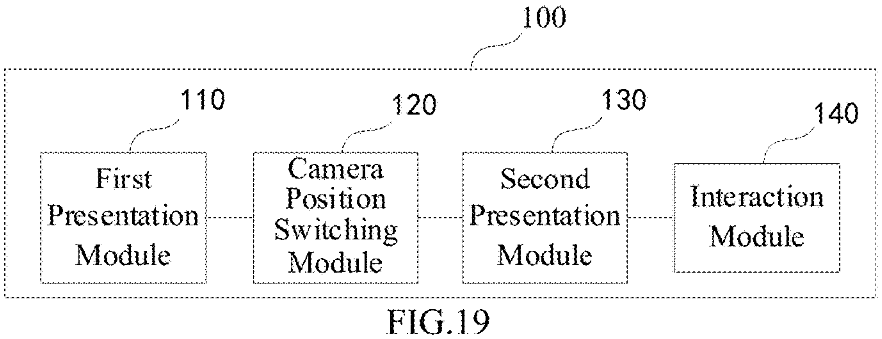
FIG. 19 is a schematic block diagram of an apparatus for virtual interaction provided by embodiments of the present application.

The following describes an apparatus for virtual interaction provided by embodiments of the present application with reference to FIG. 19. The FIG. 19 is a schematic block diagram of the apparatus of virtual interaction provided by the embodiments of the present application.

As shown in FIG. 19, the apparatus for virtual interaction 100 includes: a first presenting module 110, a camera position switching module 120, a second presenting module 130 and an interacting module 140.

Herein, the first presenting module 110, is configured to present a media content stream in a virtual space, wherein the media content stream comprises at least one interactive object.

The camera position switching module 120, is configured to switch a current camera position to a target camera position, according to interactive indication information.

The second presenting module 130, is configured to present an interactive trigger zone and the interactive object in interactive space of the target camera position.

The interacting module 140, is configured to interact with the interactive object according to the interactive trigger zone.

In one or more implementations of the embodiments of the present application, the interacting module 140, is especially configured to:

accomplish the same action as an interactive action of the interactive object on the interactive trigger zone, according to the interactive action of the interactive object.

In one or more implementations of the embodiments of the present application, the interactive action of the interactive object is obtained based on photographing at the target camera position.

In one or more implementations of the embodiments of the present application, the second presenting module 130, is also configured to present an interactive prop in the interactive space of the target camera position.

Correspondingly, the interacting module 140, is especially configured to:

control the interactive prop to move to the interactive trigger zone, in response to a controlling operation of the interactive prop; and determine that the interactive prop contacts the interactive object in a case where the interactive prop and the interactive object move to the interactive trigger zone, and send a special effect for interaction form the interactive trigger zone to interactive space of the object camera position.

In one or more implementations of the embodiments of the present application, the apparatus 100, further comprises:

a first output module, configured to output a first vibration feedback and a first sound effect feedback corresponding to the special effect for interaction.

In one or more implementations of the embodiments of the present application, the apparatus 100, further comprises:

a third presenting module, configured to present a special effect for trigger on the interactive trigger zone.

In one or more implementations of the embodiments of the present application, the apparatus 100, further comprises:

a second output module, configured to output a second vibration feedback and a second sound effect feedback corresponding to the special effect for trigger.

In one or more implementations of the embodiments of the present application, the interacting module 140, is also configured to:

send a plurality of consecutive special effects for interaction to the interactive space of the target camera position from the interactive trigger zone, in a case where a plurality of contacts with the interactive object on the interactive trigger zone is detected within a pre-set interaction time duration.

In one or more implementations of the embodiments of the present application, the camera position switching module 120, is specifically configured to:

switch the current camera position to the target camera position, according to the interactive indication information in the media content stream;

or, switch the current camera position to the target camera position, according to interactive indication information on a timeline node.

In one or more implementations of the embodiments of the present application, the camera position switching module 120, is also configured to:

determine whether a current position of the media content stream includes interactive indication information or not; and switch the current camera position to the target camera position, in a case where the current position of the media content stream includes the interactive indication information.

In one or more implementations of the embodiments of the present application, the apparatus 100, further comprises:

an information determination module, configured to determine the interactive indication information in the media content stream, according to supplemental enhancement information inserted at a plurality of positions in the media content stream.

In one or more implementations of the embodiments of the present application, the apparatus 100, further comprises:

a fourth presenting module, configured to present an interactive prompt interface in interactive space of the current camera position, wherein the interactive prompt interface comprises: interactive prompt information, an interactive prompt icon, an interactive give-up control and an interactive determination control.

Correspondingly, the camera position switching module 120, is specifically configured to:

switch the current camera position to the target camera position, in response to a selecting operation of the interactive determination control.

In one or more implementations of the embodiments of the present application, the camera position switching module 120, is also configured to:

switch the interactive prompt icon from a normal state to the minimal state and display it in the interactive space of the current camera position, in response to a selecting operation of the interactive give-up control.

In one or more implementations of the embodiments of the present application, the apparatus module 100, further comprises:

a response module, configured to switch the current camera position to the target camera position, in response to a trigger operation to the interactive prompt icon in the minimal state.

In one or more implementations of the embodiments of the present application, the apparatus module 100, further comprises:

a fourth presenting module, configured to present an animation special effect for interactive prompt in the interactive space of the current camera position.

In one or more implementations of the embodiments of the present application, the apparatus module 100, further comprises:

a fifth presenting module, configured to present interactive guidance information around the interactive trigger zone, and process a border of the interactive trigger zone with a special effect.

In one or more implementations of the embodiments of the present application, the apparatus module 100, further comprises:

a sixth presenting module, configured to present a special effect for the end of the interaction and prompt information for the end of the interaction in interactive space of the target camera position, when interacting with the interactive object is ended.

In one or more implementations of the embodiments of the present application, the interacting with the interactive object, comprises at least one of:

performing a high-five interaction with the interactive object;

performing a hugging interaction with the interactive object; and performing a handshake interaction with the interactive object.

In one or more implementations of the embodiments of the present application, the media content stream comprises at least one of a video stream and a streaming multimedia file;

wherein, the media content stream includes: a 180° 3D media content stream and a 360° 3D media content stream.

The apparatus for virtual interaction provided by the embodiments of the present application, switches a current camera position to a target camera position according to interactive indication information in the process of presenting a media content stream by presenting the media content stream in a virtual space; presents an interactive trigger zone and an interactive object in interactive space of the target camera position; and then, interacts with the interactive object according to the interactive trigger zone. The present application carries out a close interaction with the interactive object of the user by switching the current camera position of the user to a camera position at which the interaction occurs utilizing the interactive indication information in the process of presenting the media content stream, and thereby the user being able to perform interactive operations with the interactive object based on a displayed interactive trigger zone in the interactive space of the camera position at which the interaction occurs, making the interactive operations of the user in the virtual space more vivid and rich, thereby enhancing interactivity of the user in the virtual space and improving interactive quality of the virtual interaction.

It shall be understood that the embodiments of the apparatus and the embodiments of the method described foregoing may be corresponded with each other, and the similar descriptions may refer to the embodiments of the method. In order to avoid repetition, this will not be repeated herein. Specifically, the apparatus 700 shown in FIG. 19 may perform the corresponding the embodiment of method of FIG. 1, and the foregoing and other operations and/or functions of the various modules in the apparatus 700 are to implement the corresponding processes in the various methods of FIG. 1, respectively, which are not repeated herein for brevity.

The apparatus 700 of embodiments of the present application is described above in conjunction with the accompanying drawings from the perspective of a functional module. It shall be understood that the functional module may be implemented in the form of hardware, in the form of instructions in the form of software, or in the form of a combination of hardware and software modules. Specifically, the steps of the first aspect of the embodiment of method of the present application embodiments may be accomplished by integrated logic circuits of the hardware in the processor and/or instructions in the form of software, and the steps of the first aspect of the method in conjunction with the disclosure of the embodiments of the present application may be directly embodied as accomplished by execution of the hardware decode processor or accomplished by execution of the combination of the hardware and software modules in the decode processor. Optionally, the software module may be located in storage media that have matured in the art such as a random memory, a flash memory, a read-only memory, a programmable read-only memory, an electrically erasable programmable memory, a register, and the like. The storage medium is located in the memory, and the processor reads the information in the memory to accomplish the steps in the above embodiment of the method of the first aspect in combination with its hardware.

In addition, in order to avoid the problem that when a user needs to cooperate with an anchor to interact in the virtual space, the specific performance of an interactive operation is ambiguous and uncertain, which affects the user's convenient interaction in the virtual space, in one embodiment of the present disclosure: during the process of presenting the media content stream in the virtual space, the interactive indication information of the media content stream in different presenting progress can be utilized to present corresponding interactive guidance information in different presenting progress of the media content stream in the virtual space simultaneously, thereby realizing the accurate guidance when performing any interactive event during the process of presenting the media content stream in the virtual space, to comprehensively guide the user to effectively perform the corresponding interactive event in different presenting progress of the media content stream in the virtual space, and ensure user's convenient interaction in the virtual space.

Figure 20:
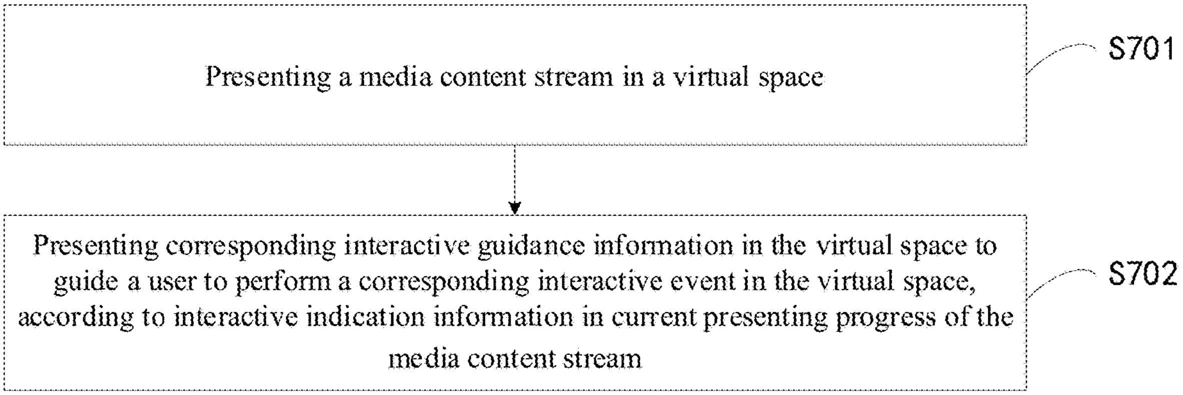
FIG. 20 is a flowchart of a method for human-machine interaction provided by the embodiments of the present application.

FIG. 20 is a flowchart of a method for human-machine interaction provided by the embodiments of the present application. The method may be applied to an XR device but is not limited to it. The method may be performed by an apparatus for human-machine interaction provided by the present application, wherein the apparatus for human-machine interaction may be implemented by way of any software and/or hardware. To be exemplary, the apparatus for human-machine interaction may be configured to an electronic device which is able to simulate a virtual scenario such as AR/VR/MR, etc. The specific type of the electronic device is not limited by the present application.

In particular, as shown in FIG. 20, the method may comprise steps as follows:

S701: presenting a media content stream in a virtual space.

The virtual space may be a corresponding virtual environment simulated by the XR device for a certain live scenario selected by any user, so as to display corresponding live interaction information in the virtual space. For example, an anchor is supported to select a certain type of live scenario to construct a corresponding virtual live environment as a virtual space in the present application, so that various viewers enter into the virtual space to realize the corresponding live interaction.

As one optional implementation in the present application, after that the user wears the XR device, the XR device is in an operating state by turning on the XR device. Then, the XR device may simulate for the user a virtual environment for displaying various media contents for diversified interaction by the user, causing the user to enter into the corresponding virtual space.

Then, for the user's watching demand for any one of the media content streams in the virtual space, the user is supported to select any one of the media content streams to be presented in the virtual space. That is, upon detecting a selection operation by a user for any of the media content streams in the virtual space, actual media content data of the selected media content stream is obtained and the media content stream is presented in the virtual space.

Among other things, the media content stream in the present application may include, but is not limited to, at least one of the following: a video stream, an audio stream, and a streaming multimedia file.

To be exemplary, the media content stream may be an audio-video live stream in a certain live scenario, e.g., an audio-video stream of a certain concert, and the like.

S702: corresponding guidance information is presented in the virtual space to guide a user to perform a corresponding interactive event in the virtual space, according to interactive indication information of the media content stream in current presenting progress.

In general, in order to ensure the user's immersive experience when watching the media content stream presented in the virtual space, the user may be supported to cooperate with the interactive demand that exists in the media content stream, to perform the corresponding interactive operations on the corresponding virtual objects in the media content stream during the process of presenting the media content stream, so as to immersively participate in the media content stream presented in the virtual space, thereby improving the user's immersive experience of watching the media content stream in the virtual space.

Considering in different presenting progress of the media content stream in the virtual space, the user may be required to cooperate to interact with a certain virtual object presented in the media content stream in the virtual space. For example, assuming that the media content stream presented in the virtual space is a certain game video stream, when a virtualized "game monster" appears at a certain progress in the virtual space, the user is required to attack the "game monster" in the virtual space, to participate in the game content.

Therefore, in order to ensure the accurate interaction of the user in the virtual space, firstly it can be analyzed whether there is an interactive demand that requires the cooperation of the user in the specific content of the media content stream presented in the virtual space in real-time. Then, corresponding interactive indication information is set respectively at various presenting time points of the interactive demands that exist in the media content stream and that require the cooperation of the user. The interactive indication information may indicate that when the presenting progress of the media content stream in the virtual space arrives at the presenting time point, the user is required to cooperate to perform a corresponding interaction with the specific content presented at the presenting time point, thereby representing a certain specific interaction event that requires the user to cooperate to perform.

Taking that the media content stream is a certain game content as an example, if a "game monster" starts to appear at the $10^{th}$ minute of the presentation of the media content, interactive indication information may be set at the $10^{th}$ minute of the media content, for indicating that the interactive event that the user cooperates to perform is to attack the "game monster".

It is known from above, during the process of presenting the media content stream in the virtual space, firstly, the corresponding interactive indication information is obtained in real time in the current presenting progress of the media content stream. If the interactive indication information obtained in the current presenting progress of the media content stream is null, the media content stream is continued to present normally. While if the interactive indication information obtained in the current presenting progress of the media content stream is not null, a specific interactive event that requires the user to cooperate to perform in the current presenting progress and the specific performance way of the interactive event may be determined, by parsing the interactive indication information in the current presenting progress of the media content stream. Then, the specific interactive event that requires the user to cooperate to perform in the current presenting progress and the specific performance way of the interactive event are generated as the interactive guidance information uniformly, and the interactive guidance information is presented in the virtual space. Then, when the user is watching the specific content in the current presenting progress of the media content stream in the virtual space, the user can also view the interactive guidance information presented in the current presenting progress simultaneously. Further, the specific interactive event that requires the user to cooperate to perform and the specific performance way in the current resenting progress are indicated to the user, so that the user can perform a certain specific interactive event that requires to cooperate to perform in the current presenting progress conveniently and swiftly in accordance with the specific description in the interactive guidance information.

In some achievable implementations, considering that the interactive event that requires the user to cooperate to perform in different presenting progress of the media content stream in the virtual space, usually requires the user to use a virtual controller in the virtual space to perform. The virtual controller in the present application may include, but is not limited to, a handle model, a hand model, a real hand projection, etc.

Then, when the corresponding interactive guidance information is presented in different presenting progress of the media content stream simultaneously, in order to show the specific performance way of the interactive event in the interactive guidance information to the user more directly, the present application may display the corresponding special effect of the interactive operation on a target component of the virtual controller in the virtual space. That is, the target component of the virtual controller is determined, by analyzing the various functional components that are required to use in the virtual controller, when the virtual controller is used to perform the interactive event that is designated by the interactive guidance information presented in the current presenting progress. Then, the corresponding special effect of interactive operation may be displayed on the target component of the virtual controller (for example, the target component is highlighted), in order to enable the user to determine the specific component that requires to be operate when the interactive event is required to be performed with cooperation in the current presenting progress more directly.

To be exemplary, taking that the virtual controller is a handle model as an example, if the interactive guidance information in the current presenting progress is "clicking on Trigger button to attack the game monster", in the handle model presented in the virtual space, the Trigger button in the handle model may be highlighted, or a continued-blinking arrow special effect may be played on an associated location with the Trigger button and the arrow is pointed to the Trigger button in the handle model.

In addition, in different presenting progress of the media content stream presented in the virtual space, after presenting the corresponding interactive guidance information simultaneously, in order to ensure the diversified interactions when the user performs interactive events under the guidance of the interactive guidance information, the present application may play the special effect of performance of the interactive event in the virtual space in response to the user's performance operation on the interactive events; and present the ending special effect of the interactive event in the virtual space, according to the upper limit of time period and the completion status of the performance of the interactive event.

That is to say, in accordance with the interactive guidance information presented in the virtual space simultaneously in different presenting progress of the media content stream, the user may control the virtual controller to perform the corresponding interactive event in the current presenting progress, thereby detecting the user's performance operation on a certain interactive event. During the process of the user performing the interactive event in the virtual space, a special effect of performance of the interactive event may be played, to enhance the interactive interest of the user in the virtual space.

In addition, in order to ensure that the interactive event can still be completed successfully even though in a condition that the performance accuracy of the user is not high, the present application may set a upper limit of time period for performing the interactive event, according to the specific characteristics of the interactive event. Then, during the process of performing the interactive event, the completion status of performing the interactive event is determined in real time by analyzing the degree of the user performing the interactive event to determine whether the user complete the performance of the interactive event or not. If the upper limit of the time period for performing the interactive event is not reached when the user completes the performance of the interactive event, indicating that the user completes the performance of the interactive event ahead of time, and then the ending special effect of the interactive event may be presented in the virtual space ahead of time to prompt the user that the interactive event is completed. If the user has not completed the performance of the interactive event when the time period for performing the interactive event has reached the upper limit of the time period for performing the interactive event, indicating that the user is no longer required to cooperate to perform the interactive event, and then the ending special effect of the interactive event may be presented directly in the virtual space, in order to continuously present the next media content in the virtual space, thereby avoiding the condition that the media content stream can't be presented normally in the virtual space caused by falling into a performance closure of the interactive event when the user is unable to complete the interactive event in a longer period for time, so that the diversified interactions of the user in virtual space in further are enhanced on the basis of ensuring that the media content stream is presented normally in the virtual space.

Figure 21:
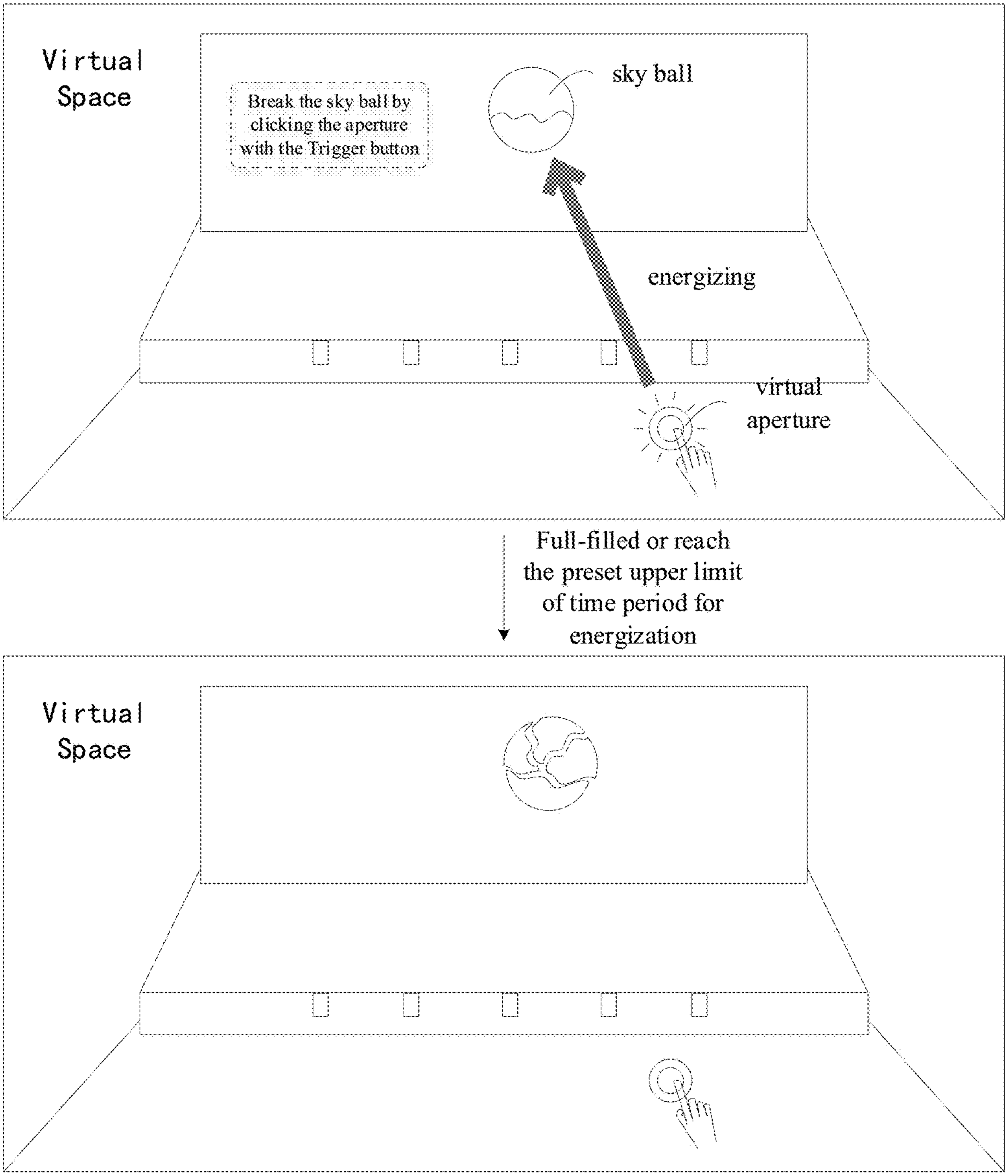
FIG. 21 is an exemplary schematic diagram of presenting interactive guidance information in the virtual space and guiding a user to perform a corresponding interactive event provided by embodiments of the present application.

To be exemplary, as shown in FIG. 21, when the live video stream of a certain concert is presented in the virtual space, one virtual object represented as a sky ball and one virtual aperture are set in the virtual space, supporting each user to continuously fire energy to the sky ball by clicking on the virtual aperture to energize the sky ball, and to transition the concert background in the virtual space after the sky ball breaks up and ends its energization. If it is necessary for the user to cooperate to break up the sky ball to perform the transition of the concert background in the current presenting progress, then the interactive guidance information presented in the current presenting progress may be "Break up the sky ball by clicking on the aperture with the trigger button". Then, after browsing the interactive guidance information, each user in the virtual space may control the Trigger button in the real handle to continuously click on the virtual aperture in the virtual space, so as to present the special effect of "continuously firing energy from the virtual aperture toward the direction of the sky ball" in the virtual space. In addition, in order to simulate the energization process of other users to the sky ball in the virtual space, the special effect of "firing energy from various directions towards the direction of the sky ball" is also presented.

In addition, when firing energy from the virtual aperture towards the direction of the sky ball continuously, a corresponding special effect of "light explosion" will be played at the virtual aperture as well as a corresponding vibration and a sound feedback, to enhance the interest of the performance of interactive event in the virtual space. During the process of firing energy to the sky ball by the user continuously, the sky sphere will show a "gradually filled" animation. In turn, if the time period for energizing the sky ball has not reached the preset upper limit of time period for energizing when the sky ball is filled, the special effect of breaking up the sky ball will be played directly as the corresponding ending special effect. If the sky ball is not yet filled when the time period for energizing the sky ball reaches the preset upper limit of time period for energizing, the special effect of breaking up the sky ball may also be played directly as the corresponding ending special effect. In turn, after the sky ball is broken up, the concert background in the virtual space may be transited, and a new concert background may be presented in the virtual space.

The technical solution provided by embodiments of the present application, presents the media content stream in the virtual space, and during the process of presenting the media content stream, presents the corresponding interactive guidance information simultaneously in the virtual space according to the interactive indication information of the media content stream in the current presenting progress, so as to realize the accurate guidance for any interactive event when it is performed during the process of presenting the media content stream in the virtual space, to comprehensively guide the user to effectively perform the corresponding interactive event in different presenting progress of the media content stream in the virtual space, ensuring the convenient interaction of the user in the virtual space to enable the user to obtain a richer and more immersive interactive experience of the media content stream in the virtual space, and to enhance the interactive interest in the virtual space.

As one optional implementation of the present application, in order to ensure the accuracy of guiding the user to interact when the media content stream is presented in the virtual space, the present application may illustrate the process of presenting the corresponding guidance information simultaneously in different presenting progress of presenting the media content stream in the virtual space.

Figure 22:
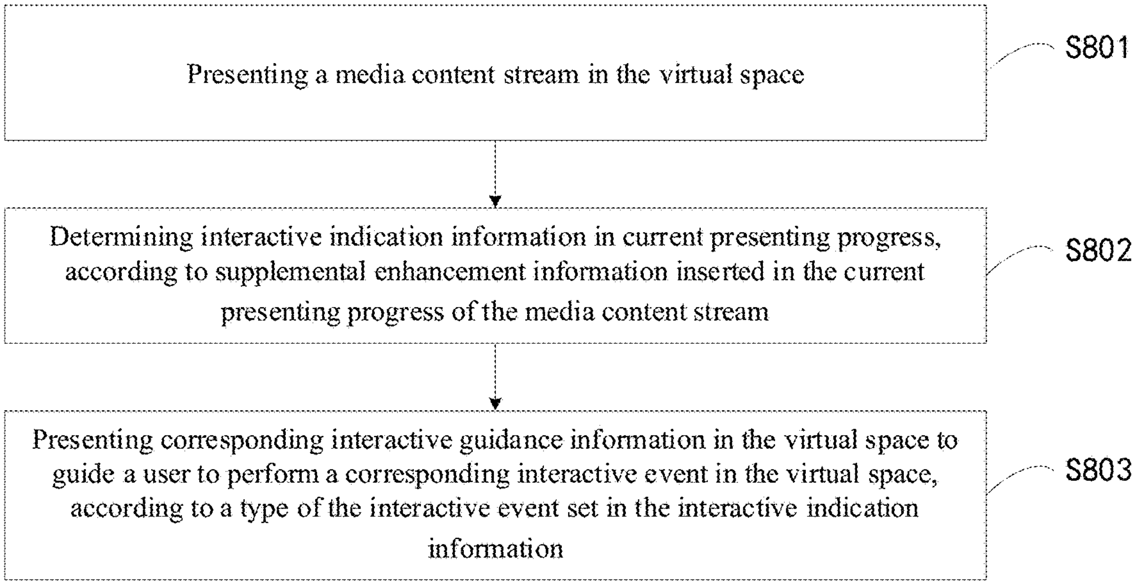
FIG. 22 is a flowchart of another method for human-machine interaction provided by the embodiments of the present application.

The FIG. 22 is a flowchart of another method for human-machine interaction provided by embodiments of the present application, and the method specifically may comprise steps as follows:

S801: presenting a media content stream in the virtual space; and

S802: determining interactive indication information in a current presenting progress, according to supplemental enhancement information inserted in the current presenting progress of the media content stream.

In order to be able to prompt the user with the corresponding interactive guidance information in time in different presenting progress of the media content stream in which a demand for the cooperation of the user to interact exists, the present application may acquire specific content in each progress of the media content stream, to analyze in real time whether a virtual object that requires the user to cooperate to interact exists in the specific content or not, so as to determine whether the demand for the cooperation of the user to interact exists in the progress or not.

Figure 23:
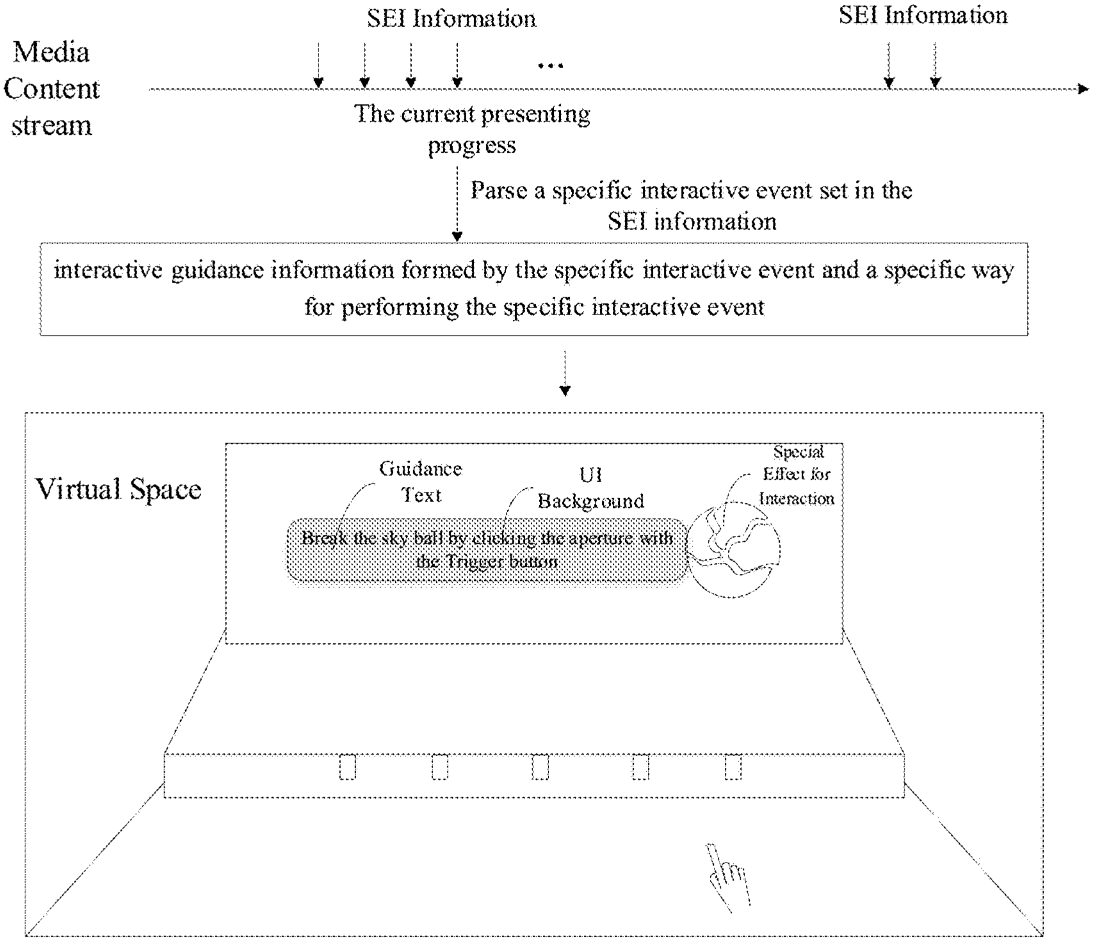
FIG. 23 is an exemplary schematic diagram of presenting interactive guidance information in the virtual space provided by embodiments of the present application.

In each progress of the media content stream in which the demand for the cooperation of the user to cooperate exists, as shown in FIG. 23, the corresponding supplemental enhancement information (SEI) may be inserted to add the extra corresponding interactive indication information into the media content stream. For example, if one "game monster" exists in the current presenting progress of presenting the media content stream, the SEI information of "clicking the Trigger button to attack the game monster" may be inserted into the current presenting progress, thereby obtaining the corresponding interactive indication information.

The SEI information is the extra interactive information that may be included in the media content stream, such as information of the interactive event that needs to be performed in cooperation defined by the user, etc., in order to increase the usability of the media content and to enable the media content to have a wider range of uses. The supplemental enhancement information may be packaged and sent together with the streaming content in the media content stream to achieve the effect of synchronized sending and parsing of the supplemental enhancement information in the media content stream.

In some achievable implementations, the content stream in the present application may be recorded previously and presented in the virtual space, or recorded in real time in a live scenario and presented in real time in the virtual space, or on the basis of a portion of the media content that has been recorded previously, the interactions of the anchor with that portion of the media content recorded previously are simultaneously recorded in real time and presented in real time in the virtual space.

Then, in these conditions above, the supplemental enhancement information inserted in the current presenting progress of the media content stream may be determined by steps as follows:

1) inserting corresponding supplemental enhancement information in the current presenting progress, according to user-oriented interaction intention of the anchor side in the current presenting progress.

For the media content recorded in real time at the anchor side in the live scenario, the anchor side will upload the real-time recorded media content to the server side in real time, and the server side will analyze the real-time recorded media content at the anchor side to determine whether there is a demand for the user to cooperate to interact in the real-time recorded media content at the anchor side. That is, the server side can determine whether there is an interactive intent of requiring the user to cooperate to perform a certain interactive operation in the current presenting progress at the anchor side, through an interactive analysis of the media content recorded in real time at the anchor side.

For example, when a user is required to cooperate to perform a certain interactive operation during a live of the anchor, the user is usually requested to perform the interactive operation through a voice description. Therefore, by parsing the real-time voice of the anchor, it may be determined whether there is a user-oriented interactive intention of the anchor in the media content in the current presenting progress.

If there is the interactive intention of the anchor side in the current presenting progress that requires the user to cooperate to perform a certain interactive operation, the corresponding supplemental enhancement information may be directly inserted in the current presenting progress to indicate the specific interactive event that requires the user to cooperate to perform in the current presenting progress.

2) The corresponding supplemental enhancement information is inserted into a plurality of key progress respectively, according to target interactive contents recorded in the plurality of key progress of the media content stream.

For the previously-recorded media content stream, the plurality of key progress that requires the user to cooperate to interact may be determined by analyzing whether there is a demand for the cooperation of the user to interact in the specific content in each progress of the media content stream. Then, it is determined the specific interactive event that requires the user to cooperate to perform in the key progress by analyzing the target interactive content recorded in the plurality of key progress of the media content stream, to insert the corresponding SEI information in the key progress. The SEI information may contain the specific interactive event that requires the user to cooperate to perform in the key progress and the specific performance way of the interactive event.

In addition, for a media content stream consisting of both previously-recorded media content and real-time recorded media content, the present application may simultaneously adopt the above two methods to insert the corresponding SEI information in each presenting progress of the media content stream, so as to ensure the comprehensiveness of the interactive guidance information presented simultaneously when the media content stream is presented in the virtual space.

As can be seen from the above, during the process of presenting the media content stream in the virtual space, the present application may obtain the inserted corresponding SEI information in real time in the current presenting progress of the media content stream. Then, by parsing the SEI information in the current presenting progress, the specific interactive event that requires the user to cooperate to perform in the current presenting progress may be obtained, so as to generate interactive indication information of the media content stream in the current presenting progress.

S803: The corresponding interactive guidance information is presented in the virtual space to guide the user to perform a corresponding interactive event in the virtual space, according to a type of the interactive event set in the interactive indication information.

After determining the interactive indication information in the current presenting progress of the media content stream, the type of the specific interactive event that requires the user to cooperate perform in the current presenting progress may be known by parsing the interactive indication information. In further, in order to ensure the accuracy of the user performing the interactive event in the current presenting progress, the present application may generate the appropriate interactive guidance information in accordance with the type of the interactive event, and present it in the virtual space. The interactive guidance information may include but no limit to the specific interactive event that requires the user to cooperate to perform in the current presenting progress and the specific performance way of the interactive event, to accurately guide the user to perform the corresponding interactive event swiftly and conveniently in the virtual space.

In some achievable implementations, in order to ensure the intuitiveness of the interactive guidance to the user in the virtual space, the present application may present a corresponding interactive guidance user interface (UI) in the virtual space according to the type of interactive event set in the interactive indication information. The interactive guidance UI may include at least guidance text, a UI background, and an interactive special effect corresponding to the interactive event type.

Figure 24:
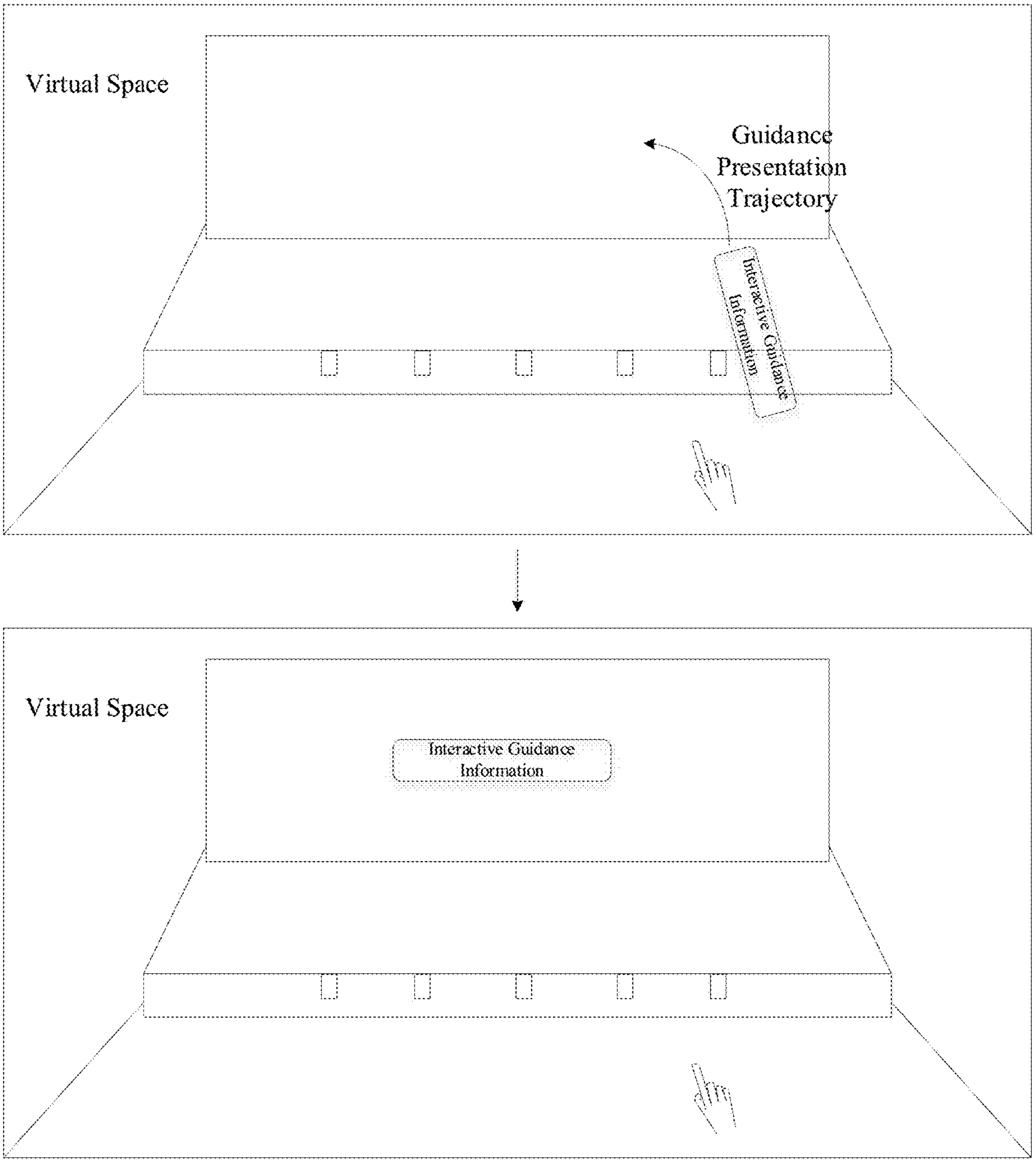
FIG. 24 is another exemplary schematic diagram of presenting interactive guidance information in the virtual space provided by embodiments of the present application.

That is to say, in the virtual space, as shown in FIG. 24, the present application may diversely display the interactive guidance information by the means of UI, to enhance the interestingness of the interactive guidance. The structure of the interactive guidance UI may be composed of the guidance text, the background pattern, and the interactive special effect of the interactive event that requires the user to cooperate to perform.

To be exemplary, when the interactive event that requires the user to cooperate to perform in the current presenting progress is to attack the virtual monster, the guidance text of "click the Trigger button to attack the game monster" may be displayed in the interactive guidance UI, and a suitable background pattern when attacking the monster may be set for the interactive guidance UI. Moreover, a target special effect for indicating an object to be attacked when attacking the monster may be displayed at the right side of the interactive guidance UI. Alternatively, when the interactive event that requires the user to cooperate to perform in the current presenting progress is to prompt the user to use a certain posture to attack the virtual monster, the guidance text of "attack the game monster with this posture", a suitable UI background pattern when attacking the monster, and an interactive special effect indicated by the specific attack posture are displayed in the interactive guidance UI.

In addition, in order to ensure the diversity of presenting the interactive guidance information in the virtual space, the present application may preset a guidance presentation trajectory and a presentation acceleration for the interactive guidance information that requires to be presented simultaneously with the media content stream in the current presenting progress, to set an animation effect when the interactive guidance information is presented in the virtual space. Then, when corresponding interactive guidance information is required to be presented in the virtual space in the current presenting progress of the media content stream, the corresponding interactive guidance information may be dynamically presented in the virtual space in accordance with the preset guidance presentation trajectory and the presentation acceleration.

As shown in FIG. 24, the preset guidance presentation trajectory may be that the interactive guidance information slides from the rear of the user to the front of the user along a certain track. Moreover, as the sliding process of the interactive guidance information is non-uniform motion, the presentation acceleration of the interactive guidance information may be set to be high first and then low, so that the interactive guidance information may quickly slide to the front of the user when it is at the back of the user, and the sliding speed will be slowly slow down when it is almost sliding to the front of the user.

In some achievable implementations, in order to avoid a prolonged blocking of the media content flow by the interactive guidance information on the basis of the user successfully browsing to the interactive guidance information, the present application may determine a time period for presenting the interactive guidance information statically when the interactive guidance information is statically presented upon the interactive guidance information is moved to the end point of the trajectory along the guidance presentation trajectory; and the presentation of the interactive guidance information is cancelled in the virtual space when the time period for static presentation reaches the preset time limit for the presentation.

In other words, when the interactive guidance information is presented in the virtual space, the interactive guidance information may be dynamically presented in the virtual space along the preset guidance presentation trajectory, and when the interactive guidance information dynamically moves to the end point of the trajectory of the guidance presentation trajectory, it may be statically presented in the virtual space. Then, in order to avoid prolonged blocking of the media content flow by the interactive guidance information when the interactive guidance information is presented in the virtual space, the present application may set an allowable maximum presentation time period for the static presentation of the interactive guidance information in the virtual space as the corresponding preset presentation time limit.

Then, when the interactive guidance information is statically presented in the virtual space, the time period of the static presentation of the interactive guidance information may be determined in real time. When the time period of the static presentation reaches the preset presentation time limit, it is indicated that there is no need to continue presenting the interactive guidance information in the virtual space, so the presentation of the interactive guidance information may be canceled by playing the corresponding special effect of the guiding cancellation in the virtual space.

The technical solution provided by embodiments of the present application, presents the media content stream in the virtual space, and during the process of presenting the media content stream, presents the corresponding interactive guidance information simultaneously in the virtual space according to the interactive indication information of the media content stream in the current presenting progress, thereby realizing the accurate guidance for any interactive event when it is performed in the process of presenting the media content stream in the virtual space, to comprehensively guide the user to effectively perform the corresponding interactive event in different presenting progress of the media content stream in the virtual space, which ensures the convenient interaction for the user in the virtual space, enables the user to obtain a richer immersive interactive experience of the media content stream in the virtual space, and enhances the interactive interest in the virtual space.

Figure 25:
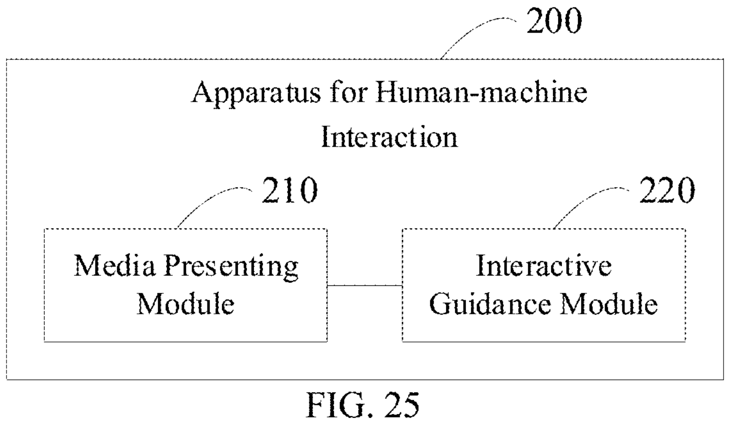
FIG. 25 is a schematic diagram of an apparatus for human-machine interaction provided by the embodiments of the present application.

FIG. 25 is a schematic diagram of an apparatus for human-machine interaction provided by the embodiments of the present application. The apparatus 200 for human-machine interaction may be configured in a XR device. The apparatus 200 for human-machine interaction comprises:

- a media presenting module 210, configured to present a media content stream in a virtual space; and
- an interactive guidance module 220, configured to present corresponding interactive guidance information in the virtual space to guide a user to perform a corresponding interactive event in the virtual space, according to interactive indication information of the media content stream in current presenting progress.

In some achievable implementations, the interactive guidance module 220 may comprises:

- an interactive indication unit, configured to determine the interactive indication information in the current presenting progress, according to supplemental enhancement information inserted in the current presenting progress of the media content stream; and
- a guidance presentation unit, configured to present the corresponding guidance information in the virtual space, according to a type of the interactive event set in the interactive indication information.

In some achievable implementations, the supplemental enhancement information inserted in the current presenting progress may be determined by an information insertion module. The information insertion module may be configured to:

- insert corresponding supplemental enhancement information in the current presenting progress, according to user-oriented interaction intention of the anchor side in the current presenting progress; and/or
- insert corresponding supplemental enhancement information in a plurality of key progress respectively, according to target interactive content recorded in the plurality of key progress of the media content stream.

In some achievable implementations, the guidance presentation unit, may be configured specifically to:

- present a corresponding interactive guidance user interface UI in the virtual space according to the type of the interactive event set in the interactive indication information.

The interactive guidance UI includes at least guidance text, a UI background, and an interactive special effect corresponding to the type of the interactive event.

In some achievable implementations, the interactive guidance module 220, may be configured specifically to:

- present the corresponding interactive guidance information dynamically in the virtual space in accordance with a preset guidance presentation trajectory and a presentation acceleration.

In some achievable implementations, the apparatus 200 for human-machine interaction, may further comprises:

- an interaction guidance cancellation module, configured to determine a time period for the static presentation of the interactive guidance information when the interactive guidance information is statically presented upon the interactive guidance information moves along the guidance presentation trajectory to the end of the trajectory; and to cancel the presentation of the interactive guidance information in the virtual space when the time period of the static presentation reaches the preset presentation time limit.

In some achievable implementations, the apparatus 200 for human-machine interaction, may further comprise:

- a component special effect display module, configured to display a special effect of a corresponding interactive operation on a target component of a virtual controller in the virtual space;
- wherein the target component is determined by the interactive guidance information.

In some achievable implementations, the apparatus 200 for human-machine interaction, may further comprise:

- an interactive event performing module, configured to play a special effect of performance of the interactive event in the virtual space in response to performing operation on the interactive event by the user; and to present an ending special effect of the interactive event in the virtual space, according to an upper limit of time period and completion status of the performance of the interactive event.

In embodiments of the present application, the media content stream is presented in the virtual space, and during the process of presenting the media content stream, the corresponding interactive guidance information is presented simultaneously in the virtual space according to the interactive indication information of the media content stream in the current presenting progress, thereby realizing the accurate guidance for any interactive event when it is performed in the process of presenting the media content stream in the virtual space, to comprehensively guide the user to effectively perform the corresponding interactive event in different presenting progress of the media content stream in the virtual space, which ensures the convenient interaction for the user in the virtual space, enables the user to obtain a richer immersive interactive experience of the media content stream in the virtual space, and enhances the interactive interest in the virtual space.

It is understood that embodiments of the apparatus and embodiments of the method in this application may correspond to each other, and similar descriptions may refer to the embodiments of the method in this application and are not repeated herein for avoiding repetition.

In particular, the apparatus 200 shown in FIG. 25 may perform any of the embodiments of the method provided by the present application, and foregoing and other operations and/or functions of various modules of the apparatus 200 shown in the FIG. 25 are to realize the corresponding processes of the embodiments of the method described above, respectively, and are not repeated herein for brevity.

The method for virtual reality-based game processing provided by one or more embodiments of the present disclosure uses extended reality (XR) technology. The extended reality technology may provide a user with a virtual reality space through combining the real and the virtual by a computer.

Figure 27:
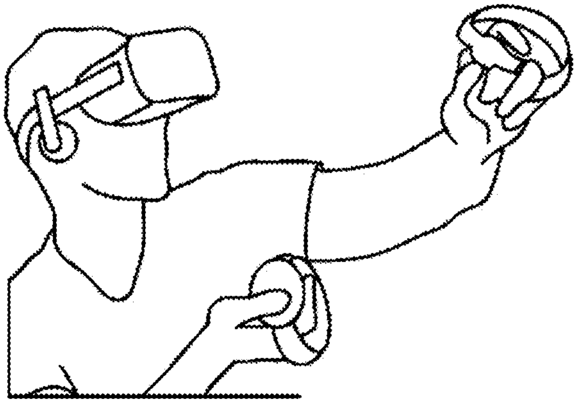
FIG. 27 is a schematic diagram of a device for virtual reality provided by one embodiment of the present application.

Referring to FIG. 27, a user may enter a virtual reality space by means of a device for virtual reality such as head-mounted VR glasses etc., and control his or her own virtual character (Avatar) in the virtual reality space to perform social interaction, entertainment, learning, telecommuting, and the like with the virtual character controlled by another user.

In one embodiment, in the virtual reality space, the user may realize the relevant interaction operation by means of a controller, which may be a handle. For example, the user carries out the relevant operation control through the operation on the buttons of the handle. Of course, in another embodiment, the target object in the device for virtual reality may also be controlled by using gestures or voice or multimodal control means without using the controller.

The device for virtual reality recorded in embodiments of the present disclosure may include, but are not limited to, the following types:

A computer-based virtual reality (PCVR) device, which utilizes a PC to perform calculations related to virtual reality functions and data output, and an external computer-based device for virtual reality which utilizes the data output from the PC to achieve virtual reality effects.

The mobile device for virtual reality supports the setting of a mobile terminal (e.g., a smartphone) in various ways (e.g., a head-mounted display set with a specialized card slot). By connecting with the mobile terminal in a wired or wireless manner, the mobile terminal carries out calculations related to the virtual reality function and outputs data to the mobile device for virtual reality, for example, by watching virtual reality videos through an APP of the mobile terminal.

The all-in-one device for virtual reality has a processor for performing calculations related to virtual functions, and thus has independent virtual reality input and output functions. It does not need to be connected to a PC or a mobile terminal, and has a high degree of freedom of use.

Of course, the form of device for virtual reality realization is not limited to this, and may be further miniaturized or large-scale according to the need.

The device for virtual reality is equipped with a posture detection sensor (e.g., a nine-axis sensor), which is used for real-time detection of changes in the posture of the device for virtual reality. If the user wears the device for virtual reality, when the user's head posture changes, the real-time posture of the head is transmitted to the processor, based on which a gaze point of the user's line of sight in the virtual environment is calculated. The image in the 3-dimensional model of the virtual environment that is in the user's gaze range (i.e., the field of virtual view) is calculated according to the gaze point, and is displayed on the display screen, making the person have an immersive experience as if he/she is watching in the real environment.

Figure 28:
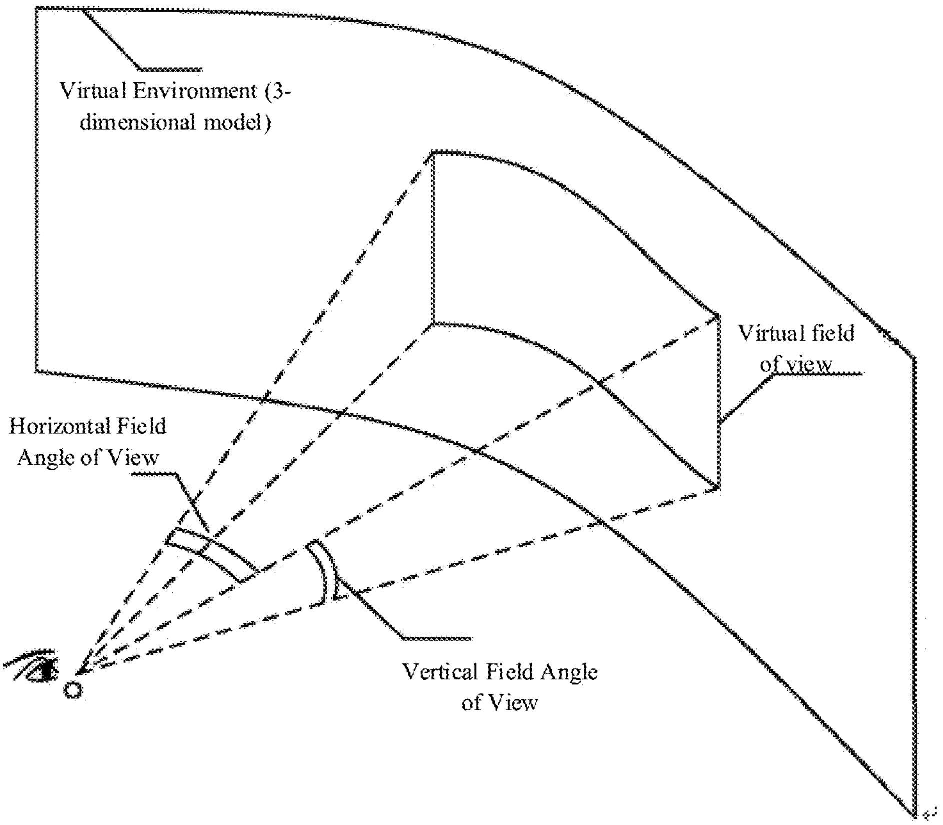
FIG. 28 is an optional schematic diagram of a field of virtual view from the device for virtual reality provided by one embodiment of the present application.

The FIG. 28 illustrates one optional schematic diagram of a field of virtual view from the device for virtual reality provided by one embodiment of the present application, which uses a horizontal field angle of view and a vertical field angle of view to describe a distribution range of the field of virtual view in a virtual environment, the distribution range in the vertical direction being represented using a vertical field angle of view BOC, and the distribution range in the horizontal direction being represented using a horizontal field angle of view AOB. The human eyes are always able to perceive, through lens, an image located in the field of virtual view in the virtual environment. It may be understood that the larger the field angle of view is, the larger the size of the field of virtual view is, and the larger the area of the virtual environment that the user is able to perceive is. The field angle of view, represents a distribution range of the angle of view that is available when the environment is perceived through the lens. For example, the field angle of view of the device for virtual reality represents a distribution range of the angle of view that the human eye has when the virtual environment is perceived through the lens of the device for virtual reality. Yet for example, for a mobile terminal provided with a camera, the field of view of the camera is a distribution range of the angle of view that the camera has when the camera perceives the real environment for taking pictures.

A device for virtual reality such as an HMD are integrated with several cameras (e.g., depth cameras, RGB cameras, etc.), and the purpose of the cameras is not limited to providing a straight-through view. The camera images and the integrated inertial measurement unit (IMU) provide data that may be processed by the methods of computer vision to automatically analyze and understand the environment. Further, the HMD is designed to support not only the passive computer vision analysis, but also the active computer vision analysis. The passive computer vision method analyzes image information captured from the environment. These methods may be single-field-of-view (images from a single camera) or body-vision (images from two cameras). They include, but are not limited to, the feature tracking, the object recognition, and the depth estimation. The active computer vision method adds information to the environment by projecting patterns that are visible to the camera but not necessarily to the human visual system. Such techniques include the time-of-flight (ToF) camera, the laser scanning, or the structured light to simplify the stereo matching problem. The active computer vision is used to enable deep scene reconstruction.

Figure 26:
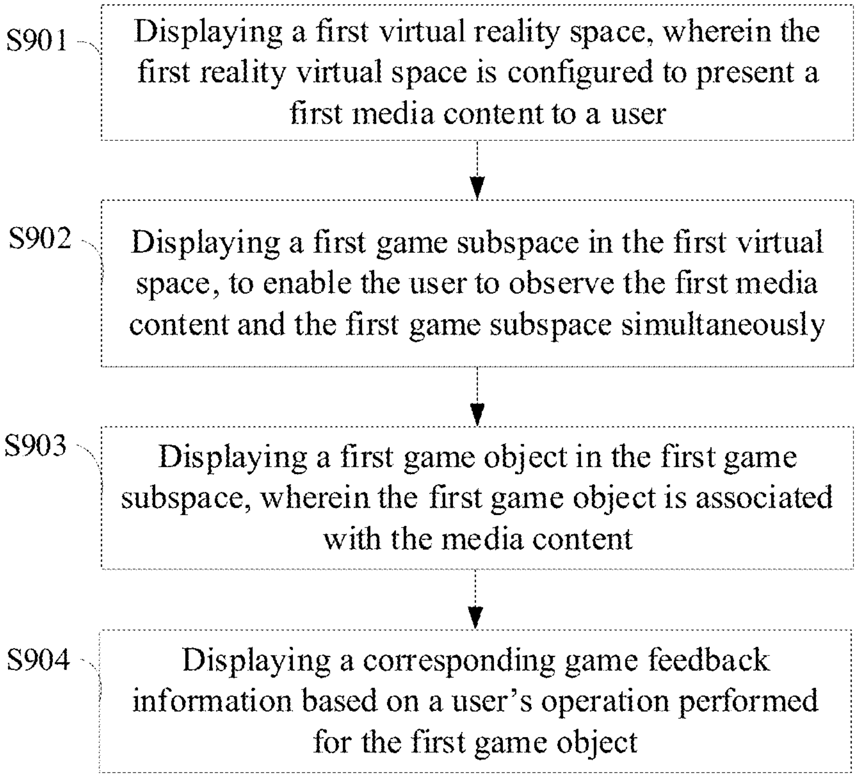
FIG. 26 is a flowchart of a method for virtual-reality based game processing provided by one embodiment of the present application.

Referring to FIG. 26, the FIG. 26 illustrates a flowchart of a method 900 for virtual-reality based game processing provided by one embodiment of the present application. The method 900 comprises steps S901-Step S904.

Step S901: first virtual reality space is displayed, wherein the first reality virtual space is used to present a first media content to a user.

The virtual reality space may be a simulated environment of the real world, a semi-simulated and semi-fictional virtual scene, or a purely fictional virtual scene. The virtual scene may be any one of a 2-dimensional virtual scene, a 2.5-dimensional virtual scene, or a 3-dimensional virtual scene, and embodiments of the present application do not limit the dimension of the virtual scene. For example, the virtual scene may include a sky, a land, an ocean, etc., and the land may include environmental elements such as a desert, a city, etc. The user may control the virtual object to move in the virtual scene.

In some embodiments, the first media content is displayed by a form of a video stream or a virtual 3D object.

In one specific implementation, the video stream may be obtained and a video content is presented in a preset area in the virtual reality space based on the video stream. To be exemplary, the video stream may utilize a coding format such as H.265, H.264, MPEG-4, and the like. In one specific implementation, the client may receive a live video stream sent by the server and display a live video image in a video image display space based on the live video stream.

In one specific implementation, a media content display zone is set in the first virtual reality space (e.g., a virtual screen) for displaying the first media content.

In one specific implementation, the first media content may comprise sporting events, concerts, live video, and the like. To be exemplary, the virtual reality space comprises a virtual live space. In the virtual live space, a performer-user may perform a live in a virtual avatar (e.g., a 3D virtual avatar) or a real image, and a viewer-user may control a virtual character to watch the performer's live in a viewing perspective such as a first-person perspective or a third-person perspective.

Step S902: first game subspace in the first virtual space is displayed, to enable the user to able to observe the first media content and the first game subspace simultaneously.

In some embodiments, an image of the first game subspace may be superimposed and displayed on an image of the first virtual space.

In some embodiments, the first game subspace is displayed in the first virtual space, in response to a first operation of the user or based on a game presentation time node.

The first operation includes, but is not limited to, a somatosensory control operation, a gesture control operation, an eyeball shaking operation, a touch operation, a voice control command, or an operation on an external control device. The first operation may include one or a set of operations.

In some embodiments, the first operation includes an operation for a first visual element displayed in the first virtual reality space. To be exemplary, one or more preset first visual elements are previously provided in the first virtual reality space, and if the first visual element is triggered by the user through the first operation, the image of the first game subspace is superimposed and displayed on the image of said first virtual space. For example, a preset game zone may be set in the first virtual reality space, and a plurality of preset game props (e.g., a soccer model) are provided in the game zone. When the user triggers the game prop (e.g., the user selects the game prop, grabs and throws the game prop, or the user controls the virtual character to be close to the game prop so that the distance from the game prop is less than the predetermined threshold), an "Open XXX mini game" button control may be displayed, and when the button control is triggered by the user, the virtual character controlled by the user enters the first game subspace. In another specific implementation, if the game prop leaves the user's field of view, the button control also no longer appears in the user's field of view.

The game presentation time node is used for the virtual reality space to automatically load the first game subspace at the time node. In some embodiments, the game presentation time node may be a preset time node of the virtual reality system. For example, one or more fixed time periods per day or per week may be used as the time when the first game subspace is open to the user.

In some embodiments, the game presentation time node may be determined based on the first media content presented in the first virtual reality space. To be exemplary, the game presentation time node may be determined based on a time node at which the first media content begins to be played or a preset time node during playing the first media content. For example, taking that the first media content is a concert as an example, the time point at which the concert starts or the time point at which a particular track starts to be performed may be taken as that game presentation time node.

In one specific implementation, the game presentation time node may be determined based on preset information contained in a media information stream (e.g., a video stream) of the first media content. To be exemplary, the preset information may be in the form of supplemental enhancement information (SEI). The supplemental enhancement information is additional information that may be included in the video stream, such as user-defined information, to increase the usability of the video and make the video have a wider range of uses. The supplemental enhancement information may be packaged and sent together with the video frames to achieve the effect that the supplemental enhancement information is sent and parsed synchronously with the video frames. In this way, when the client decodes the media information stream, the game presentation time node may be determined by the supplemental enhancement information in the media information stream.

In some embodiments, the first game subspace may provide a timing input type game to a user. In a timing input type game, a player is required to perform a prescribed operation at a prescribed timing, and the timing of the player's operation will be compared to a baseline timing to evaluate the player's operation (e.g., to determine the player's game score). A timing input type game may include a music game, which is a game in which a player is required to perform a prescribed operation input at a timing corresponding to the advancement of a musical score, and the timing of the input is compared to a baseline timing to evaluate the player's operation. The music game is, for example, a game about proficiency of playing rhythms, intervals, and the like.

In some embodiments, a countdown may be displayed at the start of the game to provide a preparation time for the user. While displaying the countdown, the contents of the game to be played next may be displayed simultaneously. Taking a music type game as an example, the name of the music to be played may be displayed simultaneously as the countdown is displayed.

Step S903: a first game object is displayed in the first game subspace, wherein the first game object is associated with the first media content.

Step S904: corresponding game feedback information is displayed based on a user's operation for the first game object.

The first game object is an object that is need to be operated by the user, such as an animation or a model, and the game system determines the user's game score according to the condition of the user's operation applied for the first game object (e.g., whether or not the timing of the operation complies with the baseline timing, and whether or not the content of the operation meets the preset requirements for the operation), and displays the corresponding game feedback information.

The game feedback information includes, but is not limited to, game score information, game evaluation information, and game animation special effects. In some embodiments, the game score information may include the player's total game score (e.g., the total score), the score corresponding to a single operation; the game evaluation information may be used to measure the player's operation accuracy, for example, it may include, but not limited to "excellent", "perfect", "very good" or "N-strike", etc.

In some embodiments, the first game object includes an animation model of an equipment or a constituent element used in an activity that the first media content relates to. To be exemplary, if the first media content relates to a sports type activity, the first game object includes an animation model of a sports equipment used in the sports activity; or, if the first media content relates to a music type activity, the first game object includes an animation model of a music equipment used in the music type activity; or, if the first media content relates to a fitness type activity, the first game object includes an animation model of a human body action. For example, if the first media content is a soccer match, the first game object may be an animation model of a soccer ball, so that the user may play a soccer-related game while watching the soccer match in the virtual reality space.

In some embodiments, the first game subspace is located at a preset location in the first virtual reality space, to enable the user to able to observe images of the first media content and the first game subspace simultaneously. To be exemplary, if the first media content is in the form of a video stream, the first game subspace may be located at a location towards or directly opposite a virtual screen playing the video in the first virtual reality space.

In some embodiments, the first game subspace includes a first area for providing an activity area for a user-controlled virtual character, a second area for displaying game feedback information, and a third area for displaying the first game object.

Figure 29:
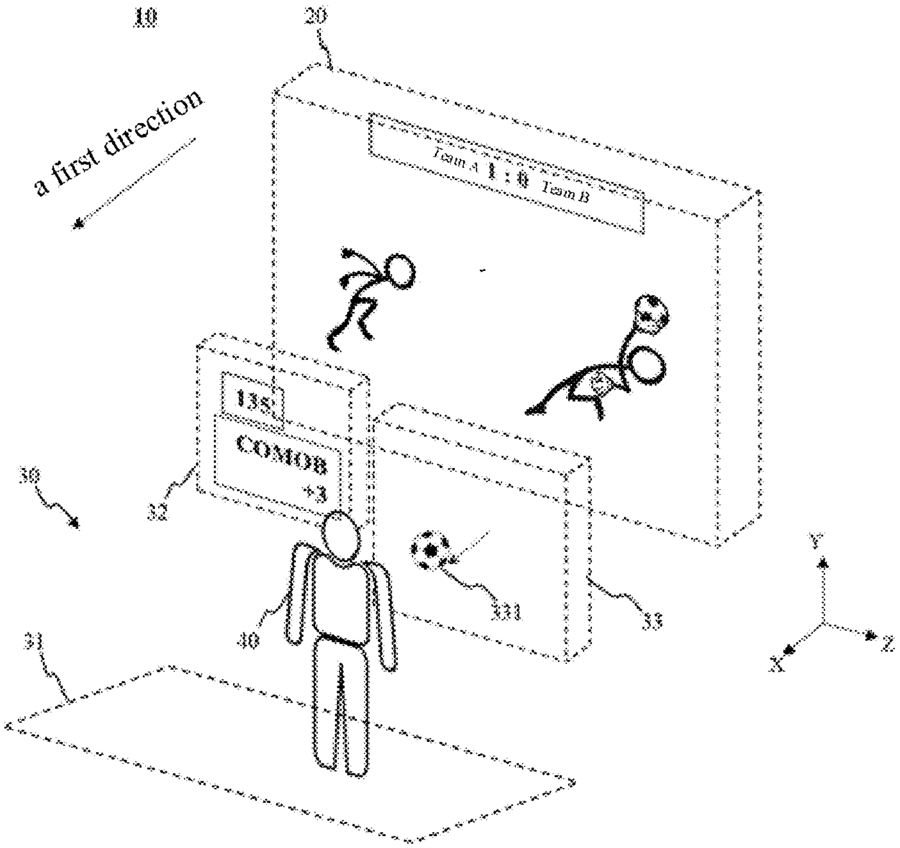
FIG. 29 is a schematic diagram of first virtual reality space provided by one embodiment of the present application.

FIG. 29 is a schematic diagram of first virtual reality space and a media content display zone in the virtual reality space provided according to one embodiment of the present disclosure. The first virtual reality space 10 includes a media content display zone 20, and first game subspace 30. The media content display zone 20 is used to display a first media content. The first game subspace 30 is located in the direction toward which the first media content is oriented (i.e., the direction of the X-axis shown in FIG. 30). The first game subspace 30 includes a first area 31 providing an active area for a user-controlled virtual character 40, a second area 32 for displaying game feedback information, and a third area 33 for displaying the first game object. The second area 32 and the third area 33 are located between the media content display zone 20 and the first area 31 to enable the user to be able to observe the images of the first media content and the first game subspace for example through the virtual character's first perspective or a third perspective simultaneously (e.g. the game feedback information displayed in the second area and the first game object displayed in the third area).

It is noted that the second area and the third area may belong to the same area or belong to two separate areas, which are limited herein in the present embodiments.

According to one or more embodiments of the present disclosure, through displaying first game subspace in first virtual reality space for presenting the first media content, and displaying the first game object associated with the first media content in the first game subspace for the user to play, the user to able to play a game associated with the first media content while watching the first media content in the virtual reality space, thereby providing a more immersive and richer media content watching and game experience to the user.

In some embodiments, the first game object moves in the first game subspace in a direction toward which the first media content is oriented.

Figure 30:
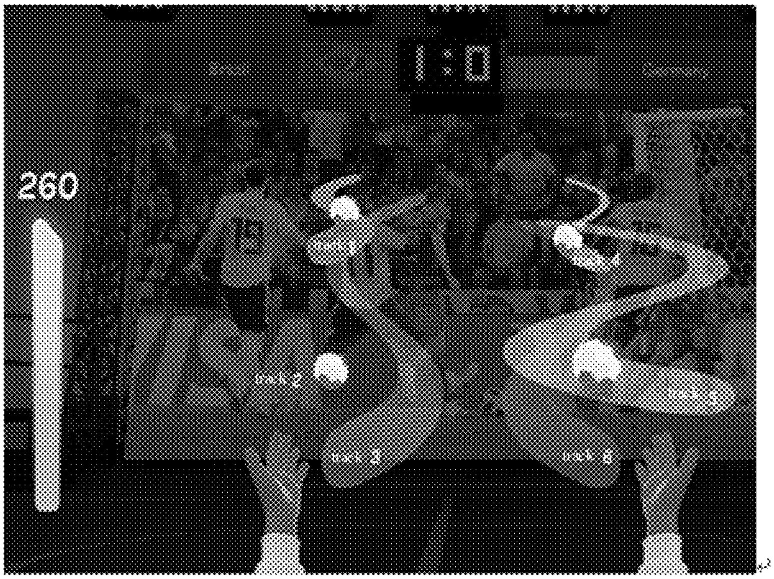
FIGS. 30-33 are a schematic diagrams of first virtual reality space and first game subspace from first perspective of a user provided by one embodiment of the present application.

Referring to FIG. 29, in the first game subspace 33, the first game object 331 (i.e., the animation model of the soccer ball) moves in the direction toward which the first media content is oriented (i.e., in the direction of the X-axis as shown in FIG. 30), which may cause the user to produce a visual effect of the animation model of the soccer ball as if it were from a soccer game being played in the media content display zone 20.

In some embodiments, the starting point of movement of the first game object may be determined based on a preset area in the media content display zone where the first media content is displayed. In some specific implementations, the preset area may be an area where the main display object (e.g., a stage or anchor) is located in the media content display zone. In some specific implementations, the preset area may be a center area of the media content display zone.

In some embodiments, the timing input type game provided by the first game subspace requires the user to perform a prescribed operation for the first game object at a prescribed timing, and the timing of the player's operation will be compared to the baseline timing, to evaluate the player's operation (e.g., to determine the player's game score). The timing input type game may include a music game, which is a game in which a player is caused to perform a prescribed operation input at a timing corresponding to the advancement of a musical score, and the timing of the input is compared to a baseline timing to evaluate the player's operation. The music game is, for example, a game about proficiency of playing rhythms, intervals, and the like.

In some embodiments, a presentation frequency (e.g., the number of presentations, the timing of presentations) of the first game object in the first game subspace may be determined based on the rhythms and/or intervals of the music played in the first media content. To be exemplary, if the rhythms of the music are faster or the intervals are higher, the presentation frequency is higher; and/or if the rhythms of the music are slower or the intervals are lower, the presentation frequency is lower. Taking a music type game as an example, the music which is being currently played in the first media content (e.g., the live video of the concert) is also the music being used in the music type game which is being played in the first game subspace, so that during the live of the concert, the user may not only enjoy the song performed in the concert, but also play the music type game using the song, thus providing the user with a more immersive and richer viewing and gaming experience.

In one specific implementation, game schemes of the corresponding first game objects may be set in advance based on different musical scores included in the first media content, and the timing of the appearance of each game scheme may be determined based on the presentation timeline of the first media content. The game schemes of the first game objects are schemes regarding the presentation timing (e.g., the frequency, the time period, etc.) and/or movement path of the first game objects in the first game subspace. To be exemplary, the music score that the current first media content is ready to play may be determined in real time based on the preset information (supplemental enhancement information) contained in the media information stream, to further determine to use which of the game schemes.

FIGS. 30 to 33 illustrate a schematic diagram of a first virtual reality space and a first game subspace in a first perspective of a user provided according to one embodiment of the present disclosure, in which a media content presented in the current first virtual reality display space is a soccer game. Referring to FIG. 30, in the first game subspace, a first game object (an animation model of a soccer ball shown in FIG. 30) moves toward a user based on six predetermined movement trajectories in total (i.e., tracks 1-6) on the left and right, and when the user touches the first game object within a prescribed time (e.g., before the disappearance of the first game object), the user may be awarded a certain score. Conversely, if the user misses touching a certain first game object, no scores are added or scores lost. If the user touches a plurality of first game objects many times consecutively (e.g., more than 2 times), additional bonus scores may be obtained. In some embodiments, the user's combo count (e.g., COMBO+N) may also be displayed in real time, and when the combo count reaches a specific value, preset animation special effects and/or vibration feedback may also be displayed, but the present disclosure is not limited to this. When the combo is broken, then the combo count is reset to zero.

Figure 31:

Referring to FIG. 31, the user may also be required to touch the first game object at a prescribed timing, for example, when the first game object is accompanied by a display of a predetermined prompt identification (e.g., the square model on the periphery of the animation model of the soccer ball shown in FIG. 31). The user touches the first game object, and obtain a certain score, and corresponding game evaluation information may be displayed (e.g., "Perfect"). In some embodiments, preset animation special effects or vibration feedback may also be displayed, but the present disclosure is not limited to this.

Figure 32:
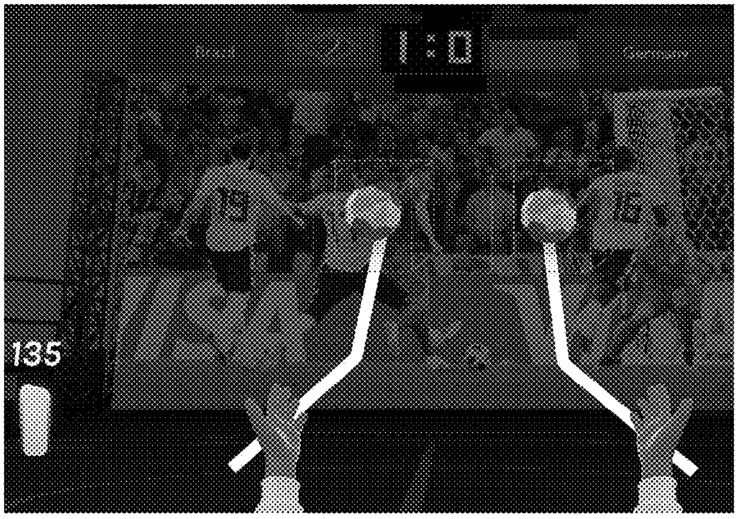
Figure 33:
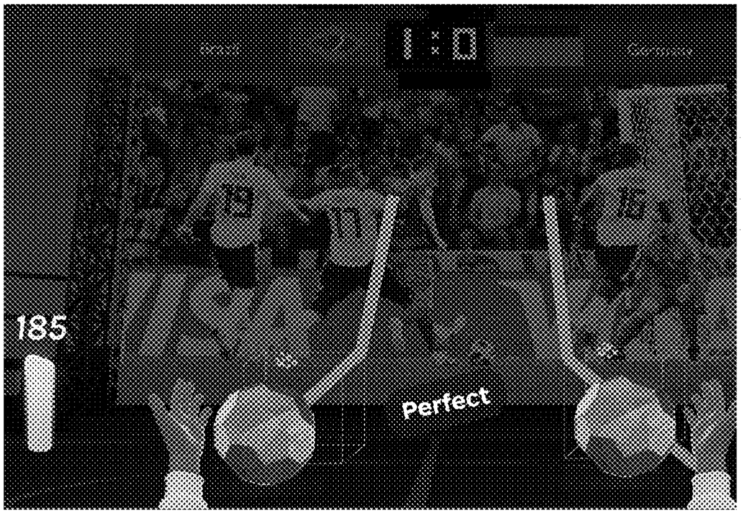
Figure 34:
FIG. 34 is a schematic diagram of first virtual reality space and first game subspace from first perspective of a user provided by another embodiment of the present application.

Referring to FIGS. 32 to 33, the user may also drag the first game object (the animation model of the soccer ball shown in FIG. 32) according to the prompt track displayed in the first game subspace. It is noted that the user's operation for the first game object may further comprise other operations in addition to touching and dragging, which is not limited herein in the present disclosure.

In some embodiments, a virtual hand which is represented a virtual character of the user may be displayed in the virtual reality space, the virtual hand being able to follow the movement of the user's real hand in the real space. To be exemplary, a motion state and position of the user's real hand in the real space may be determined by a motion sensor built into a controller (e.g., a handle) held by the user, and based on these, a motion state and position of the virtual hand in the first virtual reality space may be determined. Based on images captured by a HMD integrated camera containing the user's real hand or the controller, the motion state and position of the user's real hand or controller in real space may also be processed and analyzed based on a computer vision method, and thereby the motion state and position of the virtual hand in the first virtual reality space is determined, but the present disclosure is not limited thereto.

Figure 35:
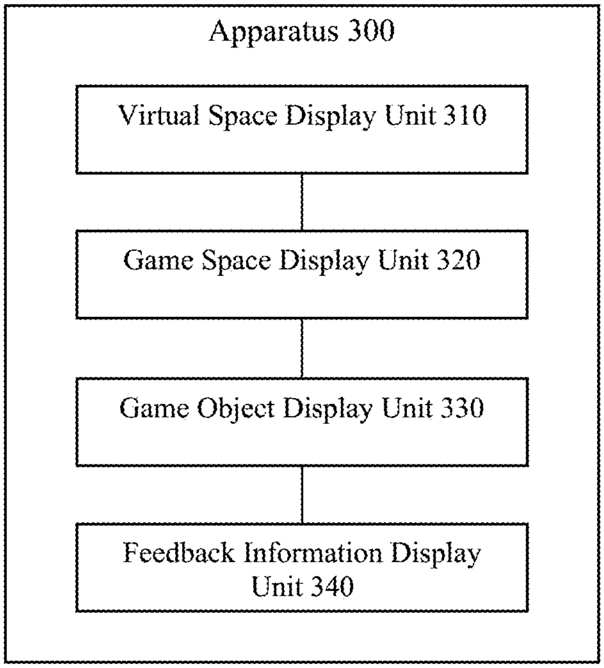
FIG. 35 is a structure schematic diagram of an apparatus for virtual-reality based game processing provided by one embodiment of the present application.

FIG. 35 illustrates a schematic diagram of first virtual reality space and a first game subspace in first perspective of a user provided according to another embodiment of the present disclosure. The media content presented in the current first virtual reality display space is a fitness-type video in performing, and the first game object is an animation model of human action.

In some embodiments, the first game subspace is displayed in the first virtual space, and a preset space transition animation may be displayed, to prompt that the user is entering into a new space. The space transition animation is also capable of masking the loading process of the first game subspace. To be exemplary, the space transition animation may include a process in which the brightness of the screen display is darkened first and then lightened (e.g., the animation special effect of "eyes open and eyes closed"), to simulate a real visual experience of the user entering the new space in a real environment.

In some embodiments, the first visual element is associated with the first media content. For example, if the first media content relates to a sports type activity, the first game object includes an animation model of sports equipment used in the sports activity; or, if the first media content relates to a music type activity, the first game object includes an animation model of music equipment used in the music type activity; or, if the first media content relates to a fitness type activity, the first game object includes an animation model of a human body action.

Accordingly, referring to FIG. 35, an apparatus 300 for virtual-reality based game processing is provided by one embodiment of the present disclosure, comprising:

- a virtual space display unit 310, configured to display first virtual reality space, wherein the first reality virtual space is configured to present a first media content to a user;
- a game space display unit 320, configured to display first game subspace in the first virtual space, to enable the user to observe the first media content and the first game subspace simultaneously;
- a game object display unit 330, configured to display a first game object in the first game subspace, wherein the first game object is associated with the media content; and
- a feedback information display unit 340, configured to display corresponding game feedback information based on a user's operation for the first game object.

In some embodiments, the game feedback information includes one or more of the following: game score information, game evaluation information, and game animation special effects.

In some embodiments, the first media content is displayed by a form of a video stream or a virtual 3D object.

In some embodiments, the first game subspace is configured to provide a user with a timing input-type game.

In some embodiments, the first game subspace is located at a preset location in the first virtual reality space.

In some embodiments, the first game subspace is located in a direction toward which the first media content is oriented.

In some embodiments, the first game object moves in the first game subspace in a direction toward which the first media content is oriented.

In some embodiments, the apparatus also comprises:

- a starting point determination unit, configured to determine a starting point of movement of the first game object based on a preset area in a media content display zone where the first media content is displayed.

In some embodiments, the apparatus also comprises:

- a presentation frequency determination unit, configured to determine a presentation frequency of the first game object in the first game subspace based on rhythms and/or intervals of music currently played in the first media content.

In some embodiments, if the rhythms of the music are faster or the intervals are higher, the presentation frequency is higher; and/or if the rhythms of the music are slower or the intervals are lower, the presentation frequency is lower.

In some embodiments, the first game object includes an animation model of an equipment or a constituent element used in an activity to which the first media content relates.

In some embodiments, if the first media content relates to a sports type activity, the first game object includes an animation model of a sports equipment used in the sports activity; or, if the first media content relates to a music type activity, the first game object includes an animation model of a music equipment used in the music type activity; or, if the first media content relates to a fitness type activity, the first game object includes an animation model of a human body action.

In some embodiments, the game space display unit is further configured to display the first game subspace in the first virtual space, in response to a first operation of the user or based on a game presentation time node.

In some embodiments, the first operation includes an operation for a first visual element displayed in the first virtual reality space, the first visual element being associated with the first media content.

In some embodiments, the first game subspace includes a first area for providing an activity area for a user-controlled virtual character, a second area for displaying the game feedback information, and a third area for displaying the first game object.

In some embodiments, the game presentation time node is determined based on the first media content.

In some embodiments, the game presentation time node is determined based on preset information contained in a media information stream of the first media content.

In some embodiments, the game space display unit is further configured to superimpose and display an image of the first game subspace on an image of the first virtual space.

For the embodiment of apparatus, since it corresponds essentially to the embodiment of method, it is sufficient to refer to a portion of the description of the embodiment of method where relevant. The embodiment of apparatus described above are merely schematic, wherein the modules described as separate modules may or may not be separate. Some or all of these modules may be selected according to actual needs to realize the purpose of the embodiment scheme. It can be understood and implemented without creative labor by a person of ordinary skill in the art.

Accordingly, according to one or more embodiments of the present disclosure, an electronic device is provided, comprising:

at least one memory and at least one processor;

wherein the memory is configured to store program codes, and the processor is configured to recall the program codes stored by the memory to enable the electronic device perform the method for virtual reality-based game processing provided according to one or more embodiments of the present disclosure.

Accordingly, according to one or more embodiments of the present disclosure, a non-transitory computer storage medium is provided, and the non-transitory computer storage medium stores program code, the program code being executable by a computer device to cause the computer device to perform the method for virtual reality-based game processing provided according to one or more embodiments of the present disclosure.

Figure 36:
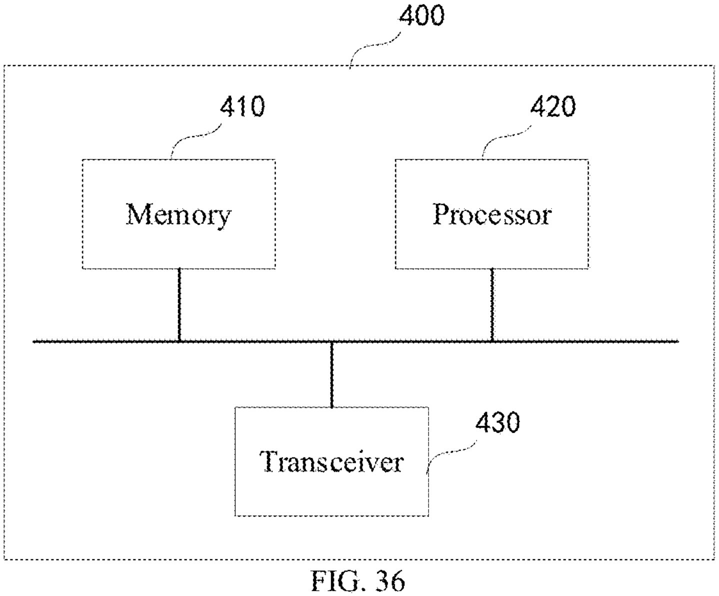
FIG. 36 is a schematic block diagram of an electronic device provided by embodiments of the present application.

FIG. 36 is a schematic block diagram of an electronic device provided by embodiments of the present application. As shown in FIG. 36, the electronic device 400 may comprise:

a memory 410 and a processor 420, wherein the memory 410 is configured to store computer program, and transfer program codes to the process 420. In other words, the processor 420 may recall and run the computer program from the memory 410 to carry out the method for virtual interaction in embodiments of the present application.

For example, the processor 420 may be configured to perform the embodiments of the method for virtual interaction described above according to the instructions in the computer program.

In some embodiments of the present application, the processor 420 may comprise, but is not limited to:

general purpose processors, digital signal processors (DSPs), application specific integrated circuits (ASICs), field programmable gate arrays (FPGAs) or other programmable logic devices, discrete gates or transistor logic devices, discrete hardware components, and the like.

In some embodiments of the present application, the memory 410 includes, but is not limited to:

volatile memory and/or non-volatile memory. Among these, the non-volatile memory may be read-only memory (ROM), programmable read-only memory (PROM), erasable programmable read-only memory (EPROM), electrically erasable programmable read-only memory (EEPROM), or flash memory. The volatile memory may be random access memory (RAM), which is used as an external cache. By way of illustration, but not limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchronous link dynamic random access memory (SLDRAM) and direct rambus random access memory (DR RAM).

In some embodiments of the present application, the computer program may be segmented into one or more modules, the one or more modules being stored in the memory 410 and executed by the processor 420 to accomplish the method for virtual interaction provided by the present application. The one or more modules may be a series of computer program instruction segments capable of accomplishing a particular function, the instruction segments being used to describe the execution process of the computer program in the electronic device.

As shown in FIG. 36, the electronic device 400 may further comprise:

a transceiver 430, wherein the transceiver 430 may be connected to the processor 420 or the memory 410.

Herein, the processor 420 may control the transceiver 430 to communicate with other devices, specifically, to send information or data to other devices or to receive information or data from other devices. The transceiver 430 may include a transmitter and a receiver. The transceiver 430 may further include an antenna, and the quantity of antennas may be one or more.

It shall be understood that the various components in the electronic device are connected via a bus system, wherein the bus system includes a power bus, a control bus, and a status signal bus in addition to a data bus.

Figure 37:
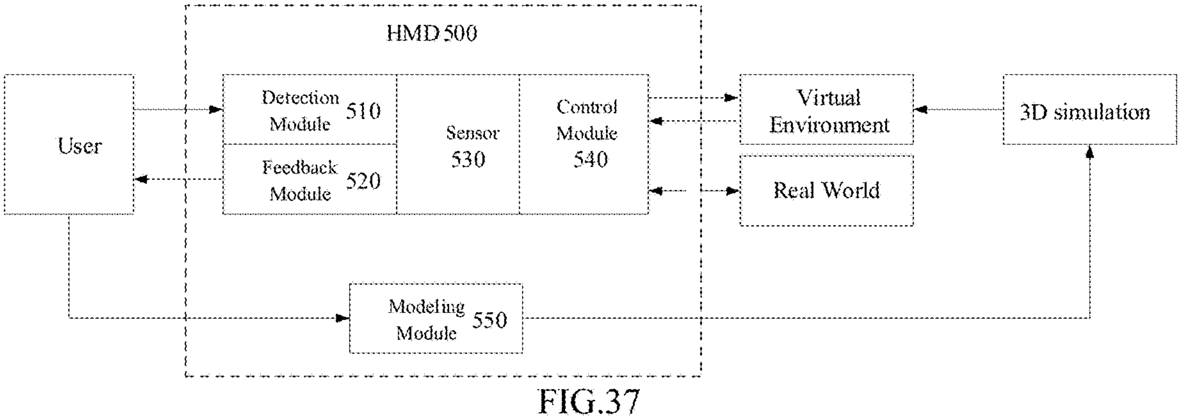
FIG. 37 is a schematic block diagram of an electronic device which is as a Head-mounted display (HMD) provided by embodiments of the present application.

In the embodiments of the present application, when the electronic device is an HMD, the embodiments of the present application provide a schematic block diagram of the HMD, as shown in FIG. 37.

As shown in FIG. 37, the main functional modules of the HMD 500 may include, but are not limited to: a detection module 510, a feedback module 520, a sensor 530, a control module 540, and a modeling module 550.

Herein, the detection module 510 is configured to detect operation commands of the user using various sensors and act them on the virtual environment, such as following the sightline of the user and constantly updating the image displayed on the display, to implement the interaction between the user and the virtual scenario.

The detection module 520 is configured to receive data from the sensor to provide a timely feedback for the user. For example, the feedback module 520 may generate a feedback instruction according to the user operation data and output the feedback instruction.

The sensor 530 is configured, on the one aspect, to receive operation commands from the user and to act them on the virtual environment. On another aspect, it is configured to provide the user with the results resulting from the operation in the form of various feedbacks.

The control module 540 is configured to control sensors and various input/output apparatuses, comprising acquiring data from the user such as movement, voice, etc. and outputting sensory data such as images, vibration, temperature, and sound, etc., to act on the user, the virtual environment, and the real world. For example, the control module 540 may acquire user gestures, voice, etc.

The modeling module 550 is configured to construct a 3-dimensional model of the virtual environment, and may further comprise various feedback mechanisms such as sound, touch, and the like in the 3-dimensional model.

It shall be understood that the various functional modules in the HMD 500 are connected via a bus system, wherein the bus system includes a power bus, a control bus, and a status signal bus, among others, in addition to a data bus.

The present application also provides a computer storage medium having stored a computer program thereon that, when executed by a computer, causes the computer to perform the methods described by the embodiments of the method described above.

The embodiments of the present application also provide a computer program product comprising program instructions that, when the program instructions are run on an electronic device, cause the electronic device to perform the methods described by the embodiments of the method described above.

When implemented using software, it may be implemented in whole or in part as a computer program product. The computer program product includes one or more computer instructions. When loaded and executed on a computer, the computer program instructions produce, in whole or in part, a process or function in accordance with embodiments of the present application. The computer may be a general-purpose computer, a specialized computer, a computer network, or other programmable apparatus. The computer instructions may be stored in a computer-readable storage medium or transmitted from one computer-readable storage medium to another computer-readable storage medium, e.g., the computer instructions may be transmitted from a web site, computer, server, or data center via wired (e.g., coaxial cable, fiber optic, digital subscriber line (DSL)) or wireless (e.g., infrared, fiber optic, DSL)) to another website site, computer, server, or data center. The computer-readable storage medium may be any usable medium to which a computer has access or a data storage device containing a server, and data center, etc. that are integrated by one or more usable media. The usable medium may be a magnetic medium (e.g., floppy disk, hard disk, tape), an optical medium (e.g., digital video disc (DVD)), or a semiconductor medium (e.g., solid state disk (SSD)), and the like.

Those of ordinary skills in the art may realize that the modules and algorithmic steps of the various examples described in conjunction with the embodiments disclosed herein are capable of being implemented in electronic hardware, or a combination of computer software and electronic hardware. Whether these functions are performed in hardware or software depends on the particular application and design constraints of the technical solution. Those of professional skills in the art may use different methods to implement the described functions for each particular application, but such implementations shall not be considered to be outside the scope of this application.

In the several embodiments provided in this application, it shall be understood that the systems, apparatuses, and methods disclosed, may be realized in other ways. For example, the embodiments of the apparatus described above are merely schematic, e.g., the division of the module, which is merely a logical functional division, may be divided in other ways when actually implemented, e.g., a plurality of modules or components may be combined or may be integrated into another system, or some features may be ignored, or not performed. As another point, the coupling or direct coupling or communication connection between each other shown or discussed may be an indirect coupling or communicative connection through some interface, apparatus or module, which may be electrical, mechanical or otherwise.

Modules illustrated as separated means may or may not be physically separated, and means shown as modules may or may not be physical modules, i.e., they may be located in one single place or they may be distributed to a plurality of network units. Some or all of these modules may be selected to fulfill the purpose of the embodiment scheme according to actual needs. For example, the various functional modules in various embodiments of the present application may be integrated in a single processing module, or each module may be physically present separately, or two or more modules may be integrated in one single module.

The foregoing are only specific implementations of the present application, but the scope of protection of the present application is not limited thereto, and any changes or substitutions that can be readily contemplated by any person skilled in the art within the scope of the art disclosed in the present application shall be covered in the scope of protection of the present application. Therefore, the scope of protection of this application shall be subject to the scope of protection of the claims.

What is claimed is:

1. A method for virtual interaction, comprising:

presenting a media content stream in a virtual space, wherein the media content stream comprises at least one interactive object;

switching a current camera position to a target camera position according to interactive indication information;

displaying an interactive trigger zone in an interactive space of the target camera position in response to switching to the target camera position;

performing at least one interaction with the at least one interactive object when the at least one interactive object and a representation of a user are in the interactive trigger zone;

displaying a visual effect in response to the at least one interactive object and the representation of the user being in the interactive trigger zone; and causing the interactive trigger zone to disappear after the at least one interaction ends.

2. The method of the claim 1, wherein the performing at least one interaction with the at least one interactive object based on the interactive trigger zone comprises:

accomplishing a same action as an interactive action of the at least one interactive object on the interactive trigger zone according to the interactive action of the at least one interactive object.

3. The method of the claim 2, wherein the interactive action of the at least one interactive object is obtained based on photographing at the target camera position.

4. The method of the claim 1, further comprising:

presenting an interactive prop in the interactive space of the target camera position;

controlling the interactive prop to move to the interactive trigger zone in response to a controlling operation of the interactive prop; and determining that the interactive prop contacts the at least one interactive object, and sending a special effect for interaction to the interactive space of the target camera position from the interactive trigger zone.

5. The method of the claim 4, further comprising:

outputting a first vibration feedback and a first sound effect feedback corresponding to the special effect for interaction.

6. The method of the claim 4, before sending the special effect for interaction to the interactive space of the object camera position from the interactive trigger zone, further comprising:

presenting a special effect for trigger on the interactive trigger zone; and outputting a second vibration feedback and a second sound effect feedback corresponding to the special effect for trigger.

7. The method of the claim 1, further comprising:

sending a plurality of consecutive special effects for interaction to the interactive space of the target camera position from the interactive trigger zone, in a case where a plurality of contacts with the at least one interactive object on the interactive trigger zone is detected within a pre-set interaction time duration.

8. The method of the claim 1, wherein the switching the current camera position to the target camera position according to the interactive indication information, comprises:

switching the current camera position to the target camera position, according to the interactive indication information in the media content stream; or switching the current camera position to the target camera position, according to the interactive indication information on a timeline node.

9. The method of the claim 8, wherein the switching the current camera position to the target camera position according to the interactive indication information in the media content stream, comprises:

determining whether a current position of the media content stream includes the interactive indication information or not; and switching the current camera position to the target camera position, in a case where the current position of the media content stream includes the interactive indication information.

10. The method of the claim 8, further comprising:

determining the interactive indication information in the media content stream, according to supplemental enhancement information (SEI) inserted at a plurality of positions in the media content stream.

11. The method of the claim 1, further comprising:

presenting an interactive prompt interface in an interactive space of the current camera position before switching to the target camera position, wherein the interactive prompt interface includes interactive prompt information, an interactive prompt icon, an interactive give-up control, and an interactive determination control;

switching the current camera position to the target camera position in response to selecting the interactive determination control; and switching the interactive prompt icon from a normal state to a minimal state and displaying the interactive prompt icon in the minimal state in the interactive space of the current camera position in response to a selecting operation of the interactive give-up control.

12. The method of the claim 11, further comprising:

switching the current camera position to the target camera position in response to a triggering operation to the interactive prompt icon in the minimal state.

13. The method of the claim 11, before presenting the interactive prompt interface in the interactive space of the current camera position, further comprising:

presenting an animation effect for interactive prompt in the interactive space of the current camera position.

14. The method of the claim 1, after displaying the interactive trigger zone in the interactive space of the target camera position, further comprising:

presenting interactive guidance information around the interactive trigger zone, and processing a border of the interactive trigger zone with a special effect.

15. The method of the claim 1, further comprising:

presenting a special effect for the end of the interaction and prompt information for the end of the interaction in the interactive space of the target camera position, when interacting with the at least one interactive object is ended.

16. The method of the claim 1, wherein the performing at least one interaction with the at least one interactive object, comprises at least one of:

performing a high-five interaction with the at least one interactive object;

performing a hugging interaction with the at least one interactive object; or performing a handshake interaction with at least one the interactive object.

17. The method of the claim 1, wherein the media content stream comprises at least one of a video stream or a streaming multimedia file;

wherein, the media content stream may include a 180° 3D media content stream and a 360° 3D media content stream.

18. An electronic device, comprising:

a processor and a memory, wherein the memory is configured to store computer programs, and the processor is configured to call the computer programs from the memory and execute the computer programs to perform operations comprising:

presenting a media content stream in a virtual space, wherein the media content stream comprises at least one interactive object;

switching a current camera position to a target camera position according to interactive indication information;

displaying an interactive trigger zone in an interactive space of the target camera position in response to switching to the target camera position;

performing at least one interaction with the at least one interactive object when the at least one interactive object and a representation of a user are in the interactive trigger zone;

displaying a visual effect in response to the at least one interactive object and the representation of the user being in the interactive trigger zone; and causing the interactive trigger zone to disappear after the at least one interaction ends.

19. A non-transitory computer-readable storage medium storing computer programs, wherein the computer programs cause a computer to perform operations comprising:

presenting a media content stream in a virtual space, wherein the media content stream comprises at least one interactive object;

switching a current camera position to a target camera position according to interactive indication information;

displaying an interactive trigger zone in an interactive space of the target camera position in response to switching to the target camera position;

performing at least one interaction with the at least one interactive object when the at least one interactive object and a representation of a user are in the interactive trigger zone;

displaying a visual effect in response to the at least one interactive object and the representation of the user being in the interactive trigger zone; and causing the interactive trigger zone to disappear after the at least one interaction ends.

20. The electronic device of claim 18, the operations further comprising:

presenting an interactive prop in the interactive space of the target camera position;

controlling the interactive prop to move to the interactive trigger zone in response to a controlling operation of the interactive prop; and determining that the interactive prop contacts the at least one interactive object and sending a special effect for interaction to the interactive space of the target camera position from the interactive trigger zone.

* * * * *